United States Patent
Han et al.

(10) Patent No.: US 10,356,667 B2
(45) Date of Patent: Jul. 16, 2019

(54) USER EQUIPMENT HANDOVER METHOD, AND BASE STATION

(71) Applicant: HUAWEI TECHNOLOGIES CO., LTD., Shenzhen (CN)

(72) Inventors: Guanglin Han, Beijing (CN); Xin Xiong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 15/200,338

(22) Filed: Jul. 1, 2016

(65) Prior Publication Data

US 2016/0316398 A1    Oct. 27, 2016

Related U.S. Application Data

(63) Continuation of application No. PCT/CN2014/070088, filed on Jan. 3, 2014.

(51) Int. Cl.
| | |
|---|---|
| H04W 36/00 | (2009.01) |
| H04W 4/06 | (2009.01) |
| H04W 76/40 | (2018.01) |
| H04W 36/02 | (2009.01) |
| H04L 12/18 | (2006.01) |

(52) U.S. Cl.
CPC ......... H04W 36/0011 (2013.01); H04W 4/06 (2013.01); H04W 36/0055 (2013.01); H04W 76/40 (2018.02); H04L 12/189 (2013.01); H04W 36/026 (2013.01)

(58) Field of Classification Search
CPC .............................................. H04W 36/0011
See application file for complete search history.

(56) References Cited

U.S. PATENT DOCUMENTS

| | | |
|---|---|---|
| 2004/0085926 A1 | 5/2004 | Hwang et al. |
| 2008/0019338 A1 | 1/2008 | Ishii et al. |
| 2011/0305183 A1 | 12/2011 | Hsu et al. |
| (Continued) | | |

FOREIGN PATENT DOCUMENTS

| | | |
|---|---|---|
| CN | 102149147 | 8/2011 |
| CN | 102316540 | 1/2012 |

OTHER PUBLICATIONS

International Search Report dated Sep. 28, 2014 in corresponding International Application No. PCT/CN2014/070088.

(Continued)

*Primary Examiner* — Jason E Mattis
(74) *Attorney, Agent, or Firm* — Staas & Halsey LLP

(57) ABSTRACT

Embodiments of the present invention provide a method. When a target base station determines that the UE needs to be handed over from a source base station to a target base station and needs to perform a handover between a unicast bearer and a multicast/multicast bearer; because a progress of sending a data packet by using a target bearer may be slower than a progress of sending a data packet by using an original bearer, the target base station receives a data packet sent by using the original bearer and a data packet sent by using the target bearer, and when it is determined that a progress of receiving the data packet is faster than or equal to a progress of receiving the data packet by the target base station by using the target bearer, the target base station hands over the UE to the target bearer.

11 Claims, 11 Drawing Sheets

(56) References Cited

U.S. PATENT DOCUMENTS

| | | | |
|---|---|---|---|
| 2012/0236776 A1 | 9/2012 | Zhang et al. | |
| 2013/0007287 A1* | 1/2013 | Chu | H04L 12/189 |
| | | | 709/227 |
| 2013/0044668 A1* | 2/2013 | Purnadi | H04W 36/0055 |
| | | | 370/312 |
| 2016/0374050 A1* | 12/2016 | Prasad | H04W 4/06 |

OTHER PUBLICATIONS

International Search Report and Written Opinion, dated Sep. 28, 2014, in International Application No. PCT/CN2014/070088 (11 pp.).

Extended European Search Report, dated Oct. 5, 2016, in European Application No. 14877151.2 (14 pp.).

*3rd Generation Partnership Project; Technical Specification Group Radio Access Network; Feasibility study for evolved Universal Terrestrial Radio Access (UTRA) and Universal Terrestrial Radio Access Network (UTRAN) (Release 11)*, 3GPP TR 25.912 V11.0.0 (Sep. 2012), pp. 1-64.

*3rd Generation Partnership Project; Technical Specification Group Radio Access Network; Requirements for Evolved UTRA (E-UTRA) and Evolved UTRAN (E-UTRAN) (Release 9)*, 3GPP TR 25.913 V9.0.0 (Dec. 2009), pp. 1-18.

*3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)*, 3GPP TS 36.300 V11.7.0 (Sep. 2013), pp. 1-209.

* cited by examiner

USER EQUIPMENT HANDOVER METHOD, AND BASE STATION

CROSS-REFERENCE TO RELATED APPLICATIONS

This application is a continuation of International Application No. PCT/CN2014/070088, filed on Jan. 3, 2014, which is hereby incorporated by reference in its entirety.

TECHNICAL FIELD

The present invention relates to communications technologies, and in particular, to a user equipment handover method and a base station.

BACKGROUND

Currently, regarding a requirement for mobile communication, people demand more than telephony and messaging services. With rapid development of the Internet (the Internet), a large quantity of multimedia services have emerged, and some of application services may be implemented by receiving same data by multiple users, such as video on demand, television broadcasting, video conferencing, online education, and interactive gaming.

Compared with a common service, a mobile multimedia service features a large amount of data, long duration, latency sensitivity, and the like. A current IP (Internet Protocol) multicast technology is not applicable to a mobile network, because the mobile network has a specific network architecture, a specific function entity, and a unique radio interface bearer, which are different from those of a wired IP network. Consequently, an existing IP multicast technology cannot support sharing of a mobile network resource among multiple mobile users. Therefore, 3G mobile operators represented by Hutchison 3G (Hutchison, an operator in Hong Kong) actively seek a new service manner, which can implement broadcast of multimedia information and consume a relatively small quantity of system resources, so as to fulfill a purpose that operation of a traditional mobile service is not affected.

To implement that a mobile network resource is most effectively utilized, the 3GPP (a global standardization organization) has proposed an MBMS (multimedia multicast and broadcast service). The MBMS refers to a point-to-multipoint service in which one data source sends data to multiple users, which implements sharing of network resources, including a resource of a mobile core network, a resource of an access network, and especially an air interface resource. The MBMS defined by the 3GPP can not only implement pure-text, low-rate messaging-type multicast and broadcast, but also implement high-rate multimedia service multicast and broadcast, which undoubtedly follows a development tendency of a mobile data service in the future.

When UE (user equipment) detects that signal quality is relatively poor or that the UE needs to perform a handover because of another factor, the UE is first handed over from the MBMS to unicast, and then be handed over from an S-eNB (source base station) to a T-eNB (target base station), as shown in FIG. 1. Because the signal quality of the UE in the S-eNB is relatively poor, and there is a problem that unicast may not cover the UE, a failure is caused in establishing the unicast in the S-eNB, and it is hard to ensure service continuity.

Further, if the UE in the S-eNB receives a service by using a unicast bearer, though the UE in the T-eNB uses a multicast/multicast bearer to implement the service, when the UE is connected to the T-eNB and wants to use the multicast/multicast bearer to receive data, generally, service continuity cannot be ensured, either.

SUMMARY

Embodiments of the present invention provide a user equipment handover method and a base station, so as to improve service continuity in a UE handover process.

According to a first aspect, a user equipment handover method is provided, including:

determining, by a target base station, that user equipment UE needs to be handed over from a source base station to the target base station and needs to perform a handover between a unicast bearer and a multicast/multicast bearer;

receiving, by the target base station, a data packet sent by using the unicast bearer and a data packet sent by using the multicast/multicast bearer; and when the target base station determines, according to a synchronization protocol data packet identifier of the data packet, that a progress of receiving a data packet by the target base station by using an original bearer is faster than or equal to a progress of receiving a data packet by the target base station by using a target bearer, handing over, by the target base station, the UE to the target bearer.

With reference to the first aspect, in a first possible implementation manner, the synchronization protocol data packet identifier is a synchronization sequence identifier and/or a data packet serial number of synchronization data.

With reference to the first aspect or the first possible implementation manner of the first aspect, in a second possible implementation manner, the determining, by a target base station, that user equipment UE needs to be handed over from a source base station to the target base station and needs to perform a handover between a unicast bearer and a multicast/multicast bearer specifically includes:

determining, by the target base station according to a service identifier in a handover request sent by the source base station, that a service implemented by the UE in the source base station by using the unicast bearer can be implemented by using the multicast/multicast bearer after the UE is handed over to the target base station.

With reference to the second possible implementation manner of the first aspect, in a third possible implementation manner, the receiving, by the target base station, a data packet sent by using the unicast bearer includes:

receiving, by the target base station, UE transmission status information sent by the source base station, and receiving a handover command response message sent by the UE;

receiving, by the target base station, a data packet that is not successfully sent by the source base station to the UE, and forwarding the data packet to the UE by means of unicast; and establishing, by the target base station, the unicast bearer used by the UE, continuing to acquire a data packet from a core network, and delivering the data packet to the UE; and that when the target base station determines, according to a synchronization protocol data packet identifier of the data packet, that a progress of receiving a data packet by the target base station by using an original bearer is faster than or equal to a progress of receiving a data packet by the target base station by using a target bearer, handing over, by the target base station, the UE to the target bearer includes:

when the target base station determines that a progress of receiving a data packet by the target base station by using the unicast bearer is faster than or equal to a progress of the service of receiving a data packet by the target base station from a core network by using the multicast/multicast bearer, using, by the target base station, the multicast/multicast bearer to replace the unicast bearer used by the UE.

With reference to the third possible implementation manner of the first aspect, in a fourth possible implementation manner, the establishing, by the target base station, the unicast bearer used by the UE, continuing to acquire a data packet from a core network, and delivering the data packet to the UE specifically includes:

establishing, by the target base station, the unicast bearer used by the UE, and sending a data packet identifier request indication to the core network, so as to instruct the core network to carry the synchronization protocol data packet identifier in the data packet when sending the data packet; and receiving, by the target base station, the data packet that is sent by the core network and that carries the synchronization protocol data packet identifier, and delivering the data packet to the UE.

With reference to the second possible implementation manner of the first aspect, in a fifth possible implementation manner, the receiving, by the target base station, a data packet sent by using the unicast bearer includes:

receiving, by the target base station, UE transmission status information sent by the source base station, and receiving the handover command response message sent by the UE, where the UE transmission status information includes an identifier of the data packet that is not successfully sent to the UE;

receiving, by the target base station, the data packet that is not successfully sent by the source base station to the UE, and forwarding the data packet to the UE by using the unicast bearer; and that when the target base station determines, according to a synchronization protocol data packet identifier of the data packet, that a progress of receiving a data packet by the target base station by using an original bearer is faster than or equal to a progress of receiving a data packet by the target base station by using a target bearer, handing over, by the target base station, the UE to the target bearer includes:

after the target base station determines, according to the synchronization protocol data packet identifier of the data packet, that a progress of receiving a data packet by the target base station from the source base station is faster than or equal to a progress of the service of receiving a data packet by the target base station from a core network by using the multicast/multicast bearer, using, by the target base station, the multicast/multicast bearer to replace the unicast bearer used by the UE, and instructing the source base station to release a context of the UE.

With reference to the first aspect or the first possible implementation manner of the first aspect, in a sixth possible implementation manner, the determining, by a target base station, that user equipment UE needs to be handed over from a source base station to the target base station and needs to perform a handover between a unicast bearer and a multicast/multicast bearer specifically includes:

determining, by the target base station according to a service identifier in a handover request sent by the source base station, that a service received by the UE in the source base station by using the multicast/multicast bearer needs to be received by using the unicast bearer.

With reference to the sixth possible implementation manner of the first aspect, in a seventh possible implementation manner, the receiving, by the target base station, a data packet sent by using the multicast/multicast bearer includes:

receiving, by the target base station, UE transmission status information sent by the source base station, and receiving the handover command response message sent by the UE, where the UE transmission status information includes the synchronization protocol data packet identifier of the data packet that is not successfully sent to the UE; and establishing, by the target base station, the unicast bearer used by the UE, acquiring, according to the synchronization protocol data packet identifier of the data packet that is not successfully sent to the UE, the data packet that is not successfully sent to the UE, and forwarding the data packet to the UE; and that when the target base station determines, according to a synchronization protocol data packet identifier of the data packet, that a progress of receiving a data packet by the target base station by using an original bearer is faster than or equal to a progress of receiving a data packet by the target base station by using a target bearer, handing over, by the target base station, the UE to the target bearer includes:

after it is determined that a progress of acquiring a data packet by the target base station according to the synchronization protocol data packet identifier of the data packet that is not successfully sent to the UE is faster than or equal to a progress of the service of receiving a data packet by the target base station by using a newly established unicast bearer, instructing the source base station to release a context of the UE; or, the receiving, by the target base station, a data packet sent by using the unicast bearer and a data packet sent by using the multicast/multicast bearer includes:

receiving, by the target base station, UE transmission status information sent by the source base station, and receiving the handover command response message sent by the UE, where the UE transmission status information includes the synchronization protocol data packet identifier of the data packet that is not successfully sent to the UE;

receiving, by the target base station, the data packet that is not successfully sent by the source base station to the UE;

establishing, by the target base station, the unicast bearer used by the UE, and sending a data packet identifier request indication to a core network, so as to instruct the core network to carry the synchronization protocol data packet identifier in the data packet when sending the data packet; and forwarding, by the target base station, the data packet that is not successfully sent to the UE to the UE, and receiving the data packet delivered by the core network by using the unicast bearer; and that when the target base station determines, according to a synchronization protocol data packet identifier of the data packet, that a progress of receiving a data packet by the target base station by using an original bearer is faster than or equal to a progress of receiving a data packet by the target base station by using a target bearer, handing over, by the target base station, the UE to the target bearer includes:

when a progress of receiving the data packet by the target base station from the source base station is faster than or equal to a progress of the service of receiving the data packet by the source base station from the core network by using a newly established unicast bearer, instructing the source base station to release a context of the UE.

With reference to the seventh possible implementation manner of the first aspect, in an eighth possible implementation manner, the establishing, by the target base station, the unicast bearer used by the UE, acquiring, according to the synchronization protocol data packet identifier of the data packet that is not successfully sent to the UE, the data packet that is not successfully sent to the UE, and forwarding the data packet to the UE specifically includes:

when the target base station requests the core network to establish the unicast bearer, sending, by the target base station, to the core network, the synchronization protocol data packet identifier of the data packet that is not successfully sent to the UE, receiving the data packet sent by the core network according to the synchronization protocol data packet identifier of the data packet that is not successfully sent to the UE, and forwarding the data packet to the UE.

According to a second aspect, a user equipment handover method is provided, including:

determining, by a source base station, that user equipment UE needs to be handed over from the source base station to a target base station;

sending, by the source base station to the target base station, a handover request that carries a service identifier of the UE, so that after determining that the UE needs to be handed over from the source base station to the target base station and needs to perform a handover between a unicast bearer and a multicast/multicast bearer, and when determining, according to a synchronization protocol data packet identifier of a data packet sent by using the unicast bearer and the multicast/multicast bearer, that a progress of receiving a data packet by the target base station by using an original bearer is faster than or equal to a progress of receiving a data packet by the target base station by using a target bearer, the target base station hands over the UE to the target bearer.

With reference to the second aspect, in a first possible implementation manner, the synchronization protocol data packet identifier is a synchronization sequence identifier and/or a data packet serial number of synchronization data.

According to a third aspect, a base station is provided, including:

a determining unit, configured to determine that user equipment UE needs to be handed over from a source base station to the target base station and needs to perform a handover between a unicast bearer and a multicast/multicast bearer;

a receiving unit, configured to receive a data packet sent by using the unicast bearer and a data packet sent by using the multicast/multicast bearer;

a handover unit, configured to: after the determining unit determines that a handover between the unicast bearer and the multicast/multicast bearer needs to be performed and when the determining unit determines, according to a synchronization protocol data packet identifier of the data packet received by the receiving unit, that a progress of receiving a data packet by the target base station by using an original bearer is faster than or equal to a progress of receiving a data packet by the target base station by using a target bearer, hand over the UE to a target bearer.

With reference to the third aspect, in a first possible implementation manner, the synchronization protocol data packet identifier is a synchronization sequence identifier and/or a data packet serial number of synchronization data.

With reference to the third aspect or the first possible implementation manner of the third aspect, in a second possible implementation manner, the determining unit is specifically configured to:

determine, according to a service identifier in a handover request sent by the source base station, that a service implemented by the UE in the source base station by using the unicast bearer can be incorporated into the multicast/multicast bearer.

With reference to the second possible implementation manner of the third aspect, in a third possible implementation manner, the receiving unit specifically includes:

a message receiving subunit, configured to receive UE transmission status information sent by the source base station, and receive a handover command response message sent by the UE;

a first data packet receiving subunit, configured to receive a data packet that is not successfully sent by the source base station to the UE, and forward the data packet to the UE by means of unicast; and a second data packet receiving subunit, configured to establish the unicast bearer used by the UE, continue to acquire a data packet from a core network, and deliver the data packet to the UE; and the handover unit is specifically configured to:

when it is determined that a progress of receiving a data packet by the target base station by using the unicast bearer is faster than or equal to a progress of the service of receiving a data packet by the target base station from a core network by using the multicast/multicast bearer, use the multicast/multicast bearer to replace the unicast bearer used by the UE.

With reference to the third possible implementation manner of the third aspect, in a fourth possible implementation manner, the second data packet receiving subunit is specifically configured to:

establish the unicast bearer used by the UE, and send a data packet identifier request indication to a core network, so as to instruct the core network to carry the synchronization protocol data packet identifier in the data packet when sending the data packet; and receive the data packet that is sent by the core network and that carries the synchronization protocol data packet identifier, and deliver the data packet to the UE until it is determined that a progress of receiving a data packet by the target base station by using a unicast bearer is faster than or equal to a progress of the service of receiving a data packet by the target base station from a core network by using a multicast/multicast bearer.

With reference to the second possible implementation manner of the third aspect, in a fifth possible implementation manner, the receiving unit specifically includes:

a message receiving subunit, configured to receive UE transmission status information sent by the source base station, and receive the handover command response message sent by the UE, where the UE transmission status information includes an identifier of the data packet that is not successfully sent to the UE; and a data packet receiving subunit, configured to receive a data packet that is not successfully sent by the source base station to the UE, and forward the data packet to the UE by using the unicast bearer; and the handover unit is specifically configured to:

after it is determined, according to the synchronization protocol data packet identifier of the data packet, that a progress of receiving a data packet by the target base station from the source base station is faster than or equal to a progress of the service of receiving a data packet by the target base station from a core network by using the multicast/multicast bearer, use the multicast/multicast bearer to replace the unicast bearer used by the UE, and instruct the source base station to release a context of the UE.

With reference to the third aspect or the first possible implementation manner of the third aspect, in a sixth possible implementation manner, the determining unit is specifically configured to:

determine, according to a service identifier in a handover request sent by the source base station, that a service received by the UE in the source base station by using a multicast/multicast bearer needs to be received by using the unicast bearer.

With reference to the sixth possible implementation manner of the third aspect, in a seventh possible implementation manner, the receiving unit specifically includes:

a message receiving subunit, configured to receive UE transmission status information sent by the source base station, and receive the handover command response message sent by the UE, where the UE transmission status information includes a synchronization protocol data packet identifier of the data packet that is not successfully sent to the UE; and a data packet receiving subunit, configured to: establish the unicast bearer of the UE, acquire, according to synchronization protocol data packet identifier of the data packet that is not successfully sent to the UE, the data packet that is not successfully sent to the UE, and forward the data packet to the UE; and the handover unit is specifically configured to:

after it is determined that a progress of acquiring a data packet by the target base station according to the synchronization protocol data packet identifier of the data packet that is not successfully sent to the UE is faster than or equal to a progress of the service of receiving a data packet by the target base station by using a newly established unicast bearer, instruct the source base station to release a context of the UE;

or, the receiving unit specifically includes:

a message receiving subunit, configured to receive UE transmission status information sent by the source base station, and receive the handover command response message sent by the UE, where the UE transmission status information includes a synchronization protocol data packet identifier of the data packet that is not successfully sent to the UE;

a first data packet receiving subunit, configured to receive a data packet that is not successfully sent by the source base station to the UE; and a second data packet receiving subunit, configured to: establish the unicast bearer used by the UE, and send a data packet identifier request indication to a core network, so as to instruct the core network to carry the synchronization protocol data packet identifier in the data packet when sending the data packet; forward the data packet that is not successfully sent to the UE to the UE; and receive the data packet delivered by the core network by using the unicast bearer; and the handover unit is specifically configured to:

when a progress of receiving the data packet by the target base station from the source base station is faster than or equal to a progress of the service of receiving the data packet by the source base station from the core network by using a newly established unicast bearer, instruct the source base station to release a context of the UE.

With reference to the seventh possible implementation manner of the first aspect, in an eighth possible implementation manner, the data packet receiving subunit is specifically configured to:

when requesting the core network to establish the unicast bearer, send the synchronization protocol data packet identifier of the data packet that is not successfully sent to the UE to the core network, receive the data packet sent by the core network according to the synchronization protocol data packet identifier of the data packet that is not successfully sent to the UE, and forward the data packet to the UE.

According to a fourth aspect, a base station is provided, including:

a handover determining unit, configured to determine that user equipment UE needs to be handed over from a source base station to a target base station; and a sending unit, configured to: after the handover determining unit determines that the UE needs to be handed over from the source base station to the target base station, send, to the target base station, a handover request that carries a service identifier of the UE, so that after determining that the UE needs to be handed over from the source base station to the target base station and needs to perform a handover between a unicast bearer and a multicast/multicast bearer, and when determining, according to a synchronization protocol data packet identifier of a data packet sent by using the unicast bearer and the multicast/multicast bearer, that a progress of receiving a data packet by the target base station by using an original bearer is faster than or equal to a progress of receiving a data packet by the target base station by using a target bearer, the target base station hands over the UE to the target bearer.

With reference to the fourth aspect, in a first possible implementation manner, the synchronization protocol data packet identifier is a synchronization sequence identifier and/or a data packet serial number of synchronization data.

According to the user equipment handover method and the base station that are provided in the embodiments of the present invention, when a target base station determines that the UE needs to be handed over from a source base station to a target base station and needs to perform a handover between a unicast bearer and a multicast/multicast bearer; because a progress of sending a data packet by using a target bearer may be slower than a progress of sending a data packet by using an original bearer, the target base station receives a data packet sent by using the original bearer and a data packet sent by using the target bearer, and when it is determined that a progress of receiving the data packet by the target base station by using the original bearer is faster than or equal to a progress of receiving the data packet by the target base station by using the target bearer, the target base station hands over the UE to the target bearer, and therefore service continuity in a UE handover process is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a user equipment handover method and a base station. A target base station determines that the UE needs to be handed over from a source base station to a target base station and needs to perform a handover between a unicast bearer and a multicast/multicast bearer; because a progress of sending a data packet by using a target bearer may be slower than a progress of sending a data packet by using an original bearer, the target base station receives a data packet sent by using the original bearer and a data packet sent by using the target bearer, and when it is determined that a progress of receiving the data packet by the target base station by using the original bearer is faster than or equal to a progress of receiving the data packet by the target base station by using the target bearer, the target base station hands over the UE to the target bearer, and therefore service continuity in a UE handover process is improved.

Figure 1:
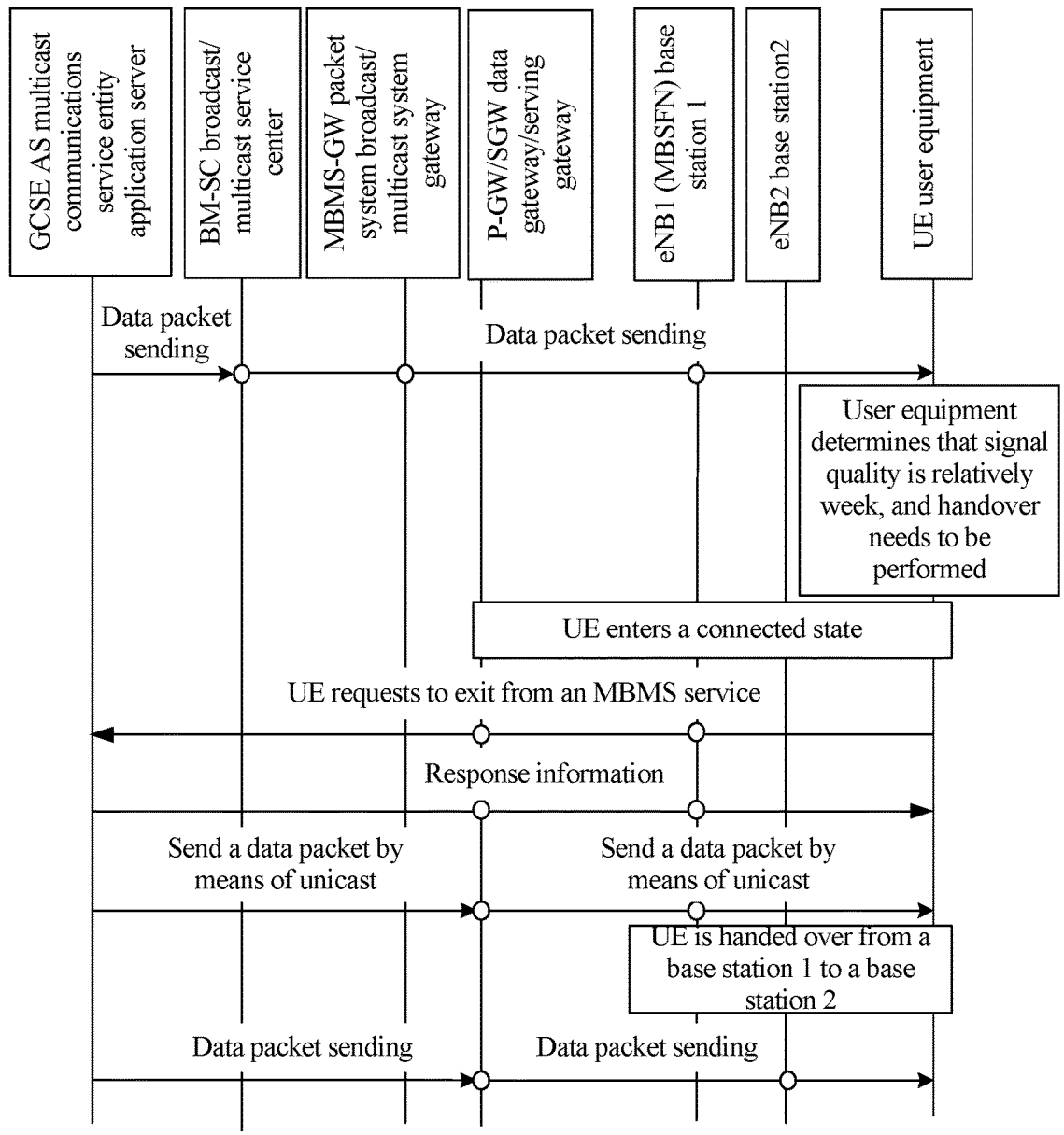
FIG. 1 is a flowchart of a user equipment handover method according to the prior art.
Figure 2:
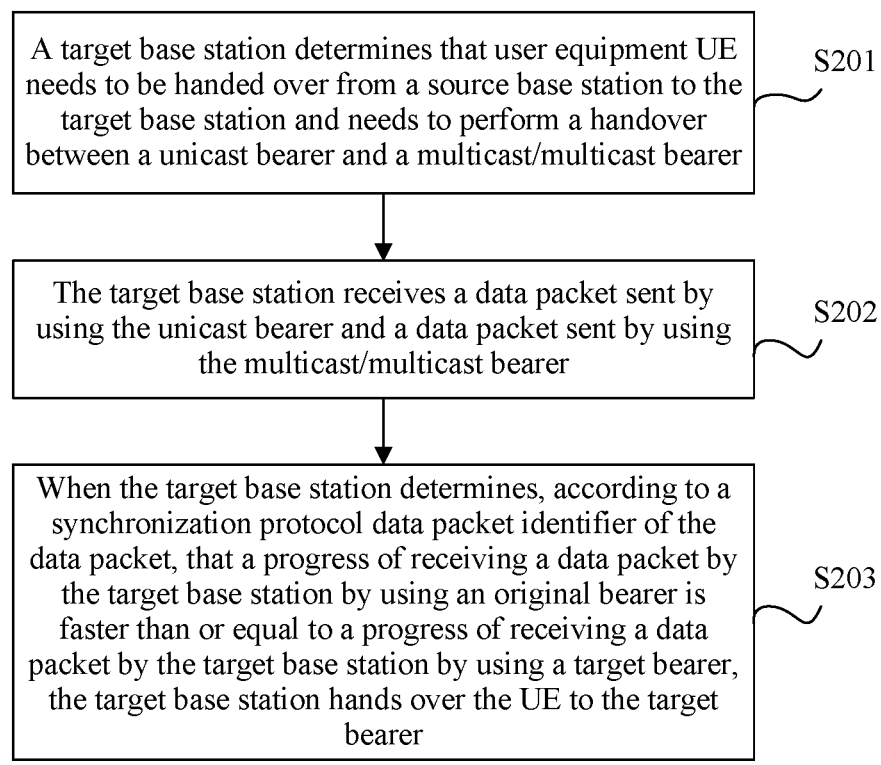
FIG. 2 is a first flowchart of a user equipment handover method according to an embodiment of the present invention.

As shown in FIG. 2, a user equipment handover method provided in an embodiment of the present invention includes:

Step S201: A target base station determines that user equipment UE needs to be handed over from a source base station to the target base station and needs to perform a handover between a unicast bearer and a multicast/multicast bearer.

Step S202: The target base station receives a data packet sent by using the unicast bearer and a data packet sent by using the multicast/multicast bearer.

Step S203: When the target base station determines, according to a synchronization protocol data packet identifier of the data packet, that a progress of receiving a data packet by the target base station by using an original bearer is faster than or equal to a progress of receiving a data packet by the target base station by using a target bearer, the target base station hands over the UE to the target bearer.

Because the data packets that are sent by using the two bearers each carry the synchronization protocol data packet identifier, the target base station may determine, according to the synchronization protocol data packet identifier, whether a progress of receiving a data packet by the target base station by using the original bearer is faster than or equal to a progress of receiving a data packet by the target base station by using the target bearer. If the progress of receiving the data packet by the target base station by using the original bearer is faster than or equal to a progress of receiving the data packet by the target base station by using the target bearer, the target base station can ensure service continuity of the UE by means of data integration, and if the progress of receiving the data packet by the target base station by using the original bearer is not faster than or equal to a progress of receiving the data packet by the target base station by using the target bearer, the target base station further needs to continue to receive a data packet sent by using the original bearer.

If synchronization protocol data packet identifiers are sorted in ascending order, and a synchronization protocol data packet identifier of the data packet that is received by the target base station by using the original bearer is greater than or equal to a synchronization protocol data packet identifier of the data packet that is received by the target base station by using the target bearer, it is considered that the progress of receiving the data packet by the target base station by using the original bearer is faster than or equal to the progress of receiving the data packet by the target base station by using the target bearer; if the synchronization protocol data packet identifiers are sorted in descending order, and the synchronization protocol data packet identifier of the data packet that is received by the target base station by using the original bearer is less than or equal to the synchronization protocol data packet identifier of the data packet that is received by the target base station by using the target bearer, it is considered that the progress of receiving the data packet by the target base station by using the original bearer is less than or equal to the progress of receiving the data packet by the target base station by using the target bearer. Likewise, if the synchronization protocol data packet identifiers are sorted according to another rule, the synchronization protocol data packet identifier may be used to determine whether the progress of receiving the data packet by the target base station by using the original bearer is faster than or equal to the progress of receiving the data packet by the target base station by using the target bearer.

Further, the synchronization protocol data packet identifier may be a synchronization sequence identifier and/or a data packet number (Packet Number, PN) of synchronization data, where the synchronization sequence identifier may be specifically a synchronization data time stamp (Time Stamp, TS).

The following describes in detail the user equipment handover method provided in this embodiment of the present invention according to different scenarios.

Figure 3:
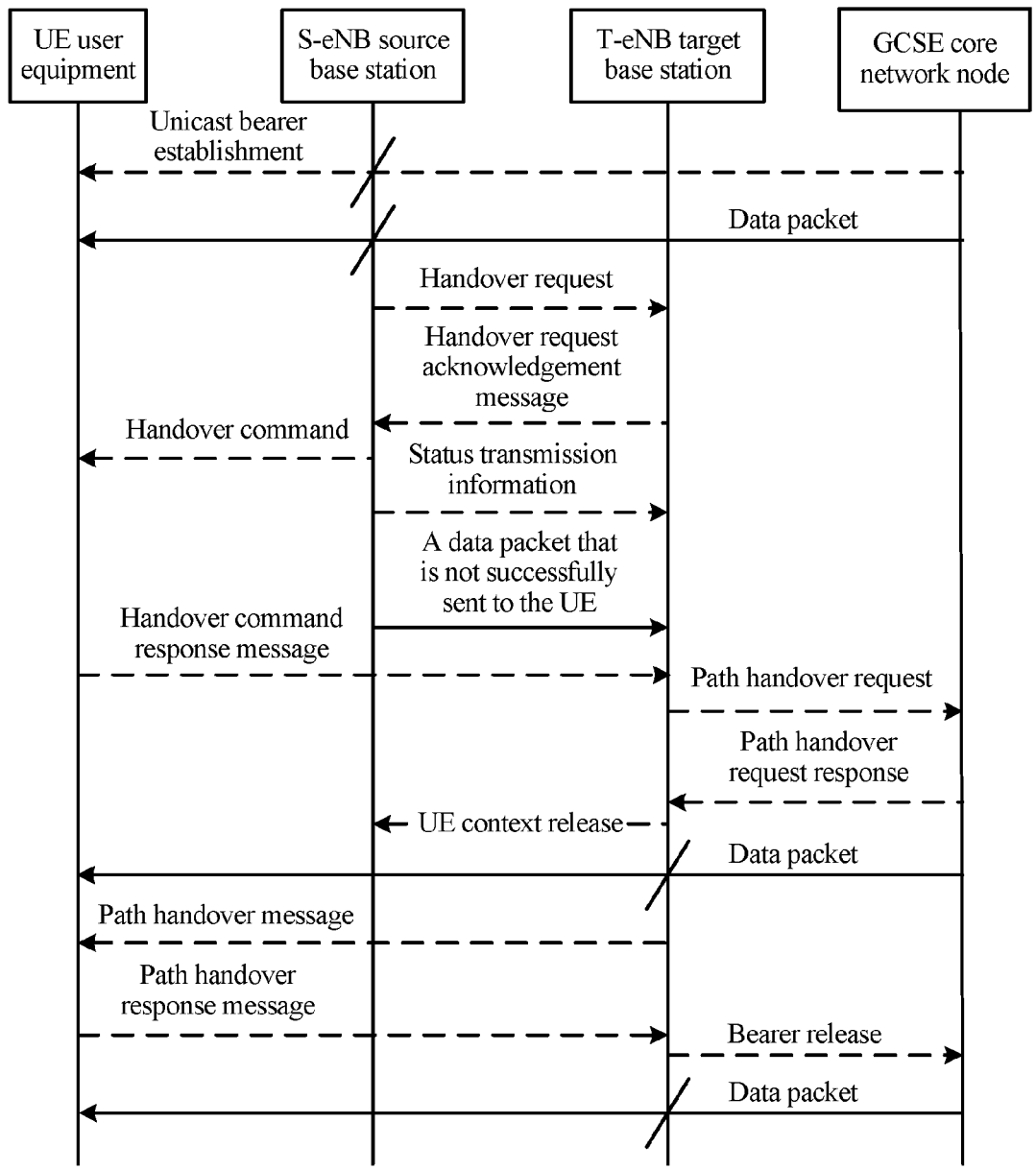
FIG. 3 is a flowchart of a user equipment handover method according to an embodiment of the present invention.

In an embodiment shown in FIG. 3, UE uses a unicast bearer to receive service data from a source base station, and may use a multicast/multicast bearer to receive service data from a target base station.

In this embodiment, the target base station receives a data packet that is sent by the source base station but not successfully delivered to the UE, forwards the data packet to the UE, establishes, after the UE is accepted, the unicast bearer used by the UE, receives a data packet sent by a core network, and when determining that the progress of receiving the data packet by the target base station by using the unicast bearer is faster than or equal to the progress of receiving the data packet by the target base station from the core network by using the multicast/multicast bearer, uses the multicast/multicast bearer to replace the unicast bearer used by the UE.

The data packet that is not successfully delivered by the source base station to the UE includes a data packet that is not delivered by the source base station to the UE, and a data packet that is not successfully received by the UE, which is confirmed by the source base station in a manner such as UE feedback.

Specifically, in this embodiment, that the target base station determines that user equipment UE needs to be handed over from a source base station to the target base station and needs to perform a handover between a unicast bearer and a multicast/multicast bearer in step S201 specifically includes:

determining, by the target base station according to a service identifier in a handover request sent by the source base station, that a service implemented by the UE in the source base station by using the unicast bearer can be incorporated into the multicast/multicast bearer.

That the target base station receives a data packet sent by using the unicast bearer in step S202 specifically includes:

receiving, by the target base station, UE transmission status information sent by the source base station, and receiving a handover command response message sent by the UE;

receiving, by the target base station, a data packet that is not successfully sent by the source base station to the UE, and forwarding the data packet to the UE by means of unicast; and establishing, by the target base station, the unicast bearer used by the UE, continuing to acquire a data packet from a core network, and delivering the data packet to the UE.

That when the target base station determines, according to a synchronization protocol data packet identifier of the data packet, that a progress of receiving a data packet by the target base station by using an original bearer is faster than or equal to a progress of receiving a data packet by the target base station by using a target bearer, the target base station hands over the UE to the target bearer in step S203 specifically includes:

when the target base station determines that a progress of receiving a data packet by the target base station by using the unicast bearer is faster than or equal to a progress of the service of receiving a data packet by the target base station from a core network by using the multicast/multicast bearer, using, by the target base station, the multicast/multicast bearer to replace the unicast bearer used by the UE.

Preferably, to facilitate the target base station in determining the progress of receiving the data packet by using the unicast bearer, the target base station may instruct the core network to carry a synchronization protocol data packet identifier in the data packet when sending the data packet; in this case, the establishing, by the target base station, the unicast bearer used by the UE, continuing to acquire a data packet from a core network, and delivering the data packet to the UE specifically includes:

establishing, by the target base station, the unicast bearer used by the UE, and sending a data packet identifier request indication to the core network, so as to instruct the core network to carry the synchronization protocol data packet identifier in the data packet when sending the data packet; and receiving, by the target base station, the data packet that is sent by the core network and that carries the synchronization protocol data packet identifier, and delivering the data packet to the UE.

Specifically, as shown in FIG. 3, steps of performing a user equipment handover in this scenario specifically include:

Step 1: A core network node (GCSE for short) establishes a unicast bearer used by an S-eNB (source base station) of an access network, where the unicast bearer is used to send data of a group communication service to the S-eNB, and the S-eNB sends configuration information that is of both the unicast bearer and a channel to UE.

The UE reads the configuration information that is of both the bearer and the channel and that is sent by the S-eNB, and prepares to receive group communication service data by using a configured unicast channel.

Step 2:

The GCSE uses the established bearer to send the group communication service data to the S-eNB, and the S-eNB uses an air interface unicast radio bearer to send the received group communication service data to the UE.

Step 3:

When S-eNB determines that the UE may be handed over from a current serving cell to a serving cell of a T-eNB (target base station), for example, signal quality of a neighboring cell is better than signal quality of the current cell, the S-eNB determines to hand over the UE to the T-eNB.

The S-eNB sends a handover request message to the T-eNB, where the handover request message may include:

a service identifier and/or a TMGI that are/is of a group communication service that requests a handover; and a bearer identifier and/or a logical channel identifier that are/is of the group communication service that requests a handover.

For different services, the foregoing steps may be repeated multiple times, that is, the handover request message includes handover request information of multiple group communication services.

Step 4:

If the T-eNB determines that the UE may be accepted, the T-eNB sends the handover request acknowledgement message to the S-eNB, where the handover request acknowledgement message may include:

a service identifier and/or a TMGI that are/is of the group communication service whose handover is accepted;

a bearer identifier and/or a logical channel identifier that are/is of the group communication service whose handover is accepted; and a status report indication, which is used to notify the S-eNB that transmission status information needs to be sent to the T-eNB or notify the S-eNB that the handover is a lossless handover.

Step 5:

The S-eNB sends a handover command to the UE, so as to instruct the UE to start to hand over to the target base station, where the handover command includes:

a service identifier and/or a TMGI that are/is of the group communication service whose handover is accepted;

a bearer identifier and/or a logical channel identifier that are/is of the group communication service whose handover is accepted;

eMBMS configuration information that is in the T-eNB and that is of the group communication service whose handover is accepted; and a status indication, which is used to notify the S-eNB that the handover is a lossless handover.

Specifically, the message may be an RRC Connection RE-configuration (radio link control connection resource reconfiguration) message.

Step 6:

The S-eNB sends a status transmission message to the T-eNB, where the status transmission message includes:

one or a combination of three of a bearer used to forward data, a logical channel identifier, and a TMGI.

Step 7:

The S-eNB forwards the data that is not successfully sent to the UE to the T-eNB.

Step 8:

The UE is connected to a serving cell of the target base station and sends a handover command response message to the T-eNB. For example, the message may be an RRC Connection RE-configuration Complete (radio link control connection resource reconfiguration complete) message.

The T-eNB sends, to the UE, the forwarded data packet received from the S-eNB.

Step 9:

The T-eNB sends a path handover request message to the GCSE, where the path handover request message may include:

a data packet identifier request indication, which is used to instruct the GCSE to carry a synchronization protocol data packet identifier in a GTP data packet when sending the GTP data packet.

Step 9-1:

The GCSE sends a path handover request response message to the T-eNB, so as to notify the T-eNB that a path handover succeeds.

Step 10:

After the T-eNB receives a receiving path handover response message, the T-eNB sends a UE Context Release (UE context release) message to the S-eNB, so as to instruct the S-eNB to release a UE context.

Step 11:

The T-eNB sends, to the UE, the data packet received from the core network.

Step 12:

When the T-eNB detects that a synchronization protocol data packet identifier included in a GTP data packet that is sent by the core network by using a unicast bearer is greater than or equal to a synchronization protocol data packet identifier received from the core network by using an eMBMS bearer, the T-eNB sends the receiving path handover message to the UE, so as to instruct the UE to start to receive the group communication service data packet by using a corresponding eMBMS channel, where the path handover message may include:

a service identifier and/or a TMGI that are/is of a to-be-handed-over group communication service;

a bearer identifier and/or a logical channel identifier that are/is of the to-be-handed-over group communication service;

a handover type: Unicast-to-eMBMS, Unicast-to-eMBMS;

eMBMS configuration information of the to-be-handed-over group communication service in the T-eNB; and a unicast bearer identifier and/or a logical channel identifier that are/is of the group communication service that needs to be released.

Step 12-1:

When the UE starts to receive the group communication service data packet from the eMBMS channel configured by the T-eNB, the UE sends the receiving path handover response message to the T-eNB, so as to notify the T-eNB that the UE has completed a handover of a receiving path, where the receiving path handover response message may include:

a service identifier and/or a TMGI that are/is of the to-be-handed-over group communication service; and a bearer identifier and/or a logical channel identifier that are/is of the to-be-handed-over group communication service.

Step 13:

The T-eNB sends a bearer release message to a core network node, so as to instruct the core network node to release the unicast bearer of the group communication service.

Step 14:

The UE receives the group communication service data packet by using a broadcast/multicast (eMBMS) channel.

Figure 4:
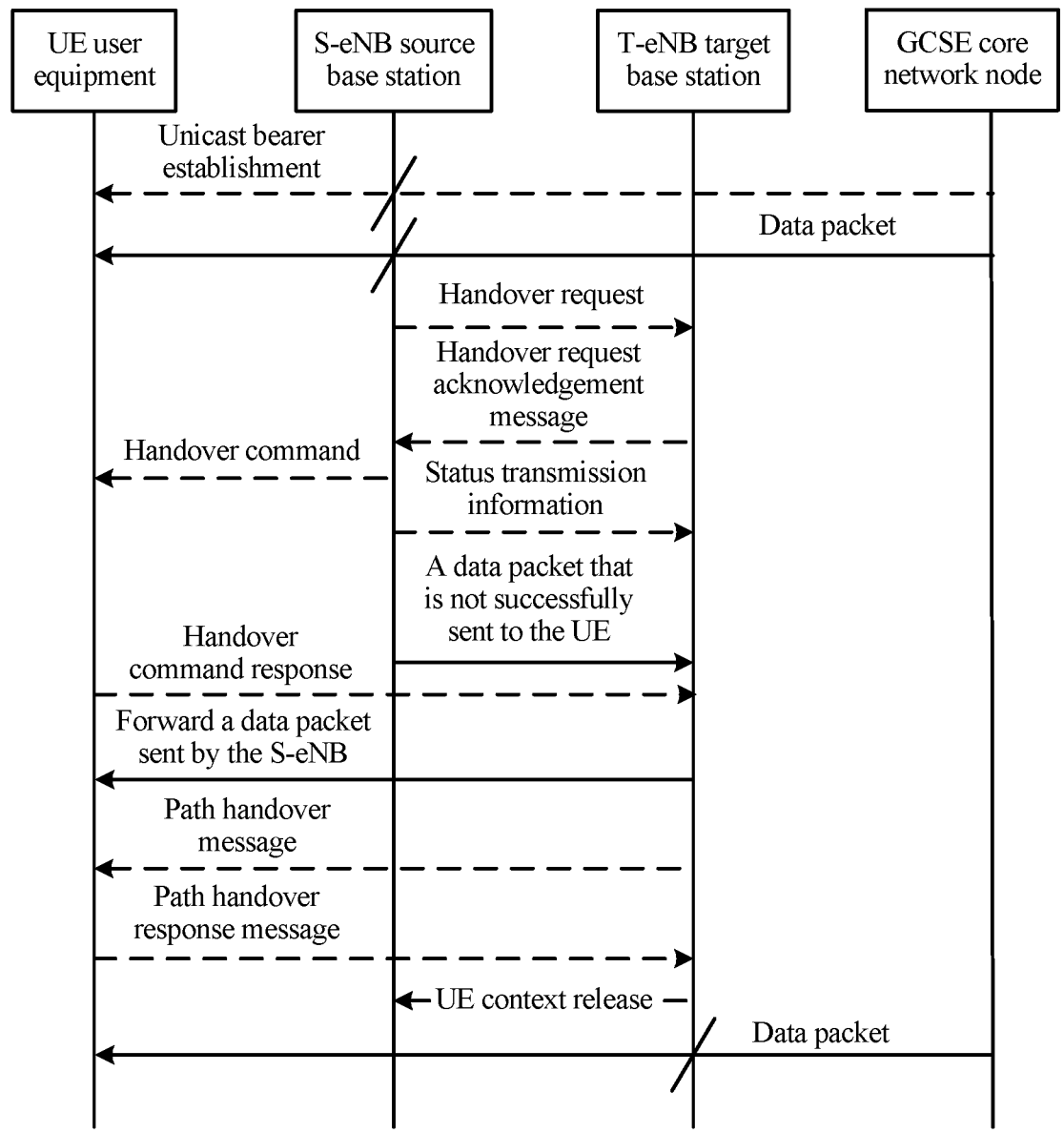
FIG. 4 is a flowchart of a user equipment handover method that is corresponding to another embodiment according to an embodiment of the present invention.
Figure 5:
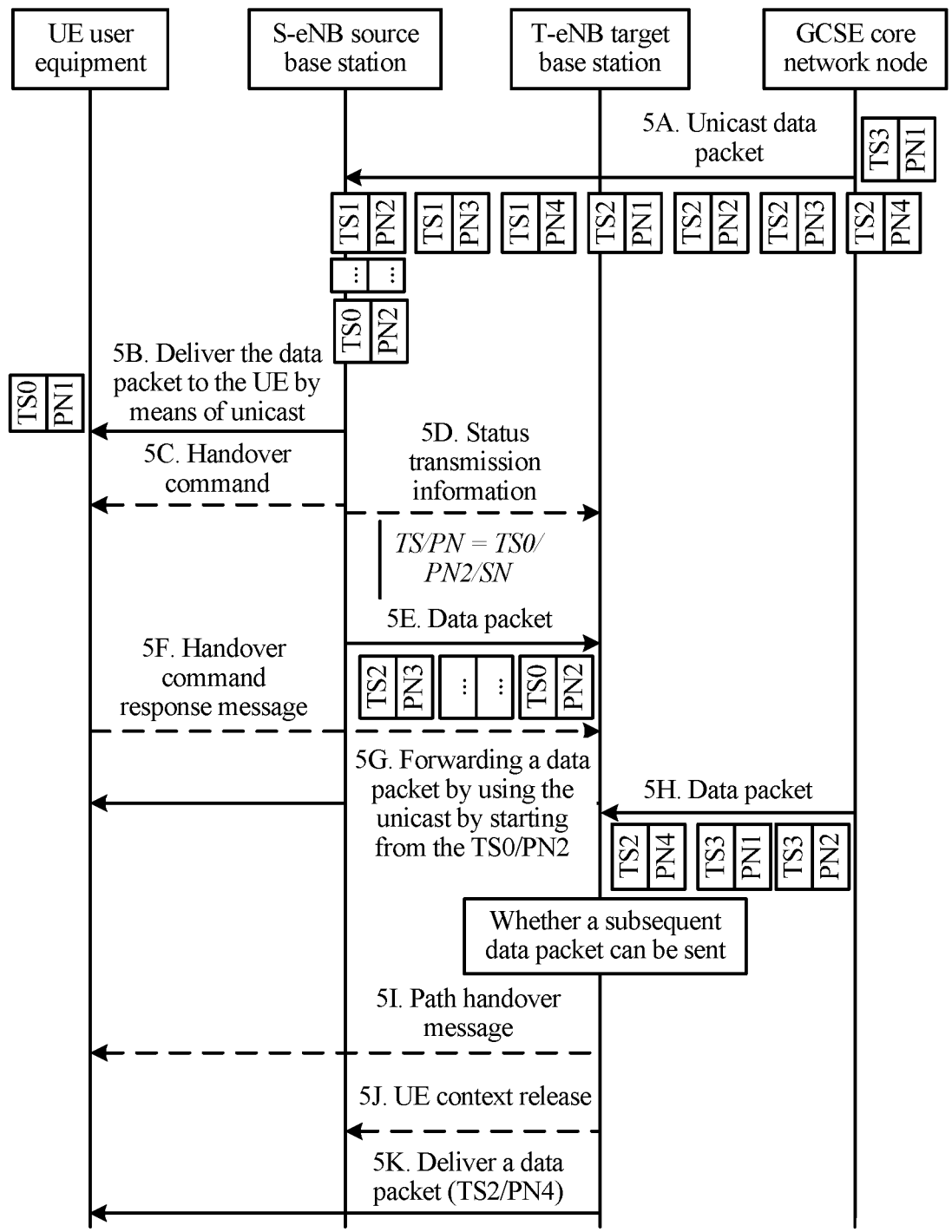
FIG. 5 is a schematic diagram of a data packet forwarding process that is corresponding to another embodiment according to an embodiment of the present invention.

In embodiments shown in FIG. 4 and FIG. 5, UE uses a unicast bearer to receive service data packet from a source base station, and may use a multicast/multicast bearer to receive service data packet from a target base station.

In these embodiments, the target base station receives a data packet that is sent by the source base station but not successfully delivered to the UE; forwards the data packet to the UE; after the UE is accepted, receives a data packet sent by a core network by using the multicast bearer, and continue to receives a data packet forwarded by the source base station by using the unicast bearer; when determining that a progress of receiving the data packet by the target base station by using the unicast bearer is faster than or equal to a progress of receiving the data packet by the target base station from the core network by using the multicast/multicast bearer, uses the multicast/multicast bearer to replace the unicast bearer used by the UE; and instructs the source base station to release a context of the UE.

The data packet that is not successfully delivered by the source base station to the UE includes a data packet that is not delivered by the source base station to the UE, and a data packet that is not successfully received by the UE, which is confirmed by the source base station in a manner such as UE feedback.

Specifically, in these embodiments, that the target base station determines that user equipment UE needs to be handed over from a source base station to the target base station and needs to perform a handover between a unicast bearer and a multicast/multicast bearer in step S201 specifically includes:

determining, by the target base station according to a service identifier in a handover request sent by the source base station, that a service implemented by the UE in the source base station by using the unicast bearer can be incorporated into the multicast/multicast bearer.

That the target base station receives a data packet sent by using the unicast bearer in step S202 specifically includes:

receiving, by the target base station, UE transmission status information sent by the source base station, and receiving the handover command response message sent by the UE, where the UE transmission status information includes an identifier of the data packet that is not successfully sent to the UE; and receiving, by the target base station, the data packet that is not successfully sent by the source base station to the UE, and forwarding the data packet to the UE by using the unicast bearer.

That when the target base station determines, according to a synchronization protocol data packet identifier of the data packet, that a progress of receiving a data packet by the target base station by using an original bearer is faster than or equal to a progress of receiving a data packet by the target base station by using a target bearer, the target base station hands over the UE to the target bearer in step S203 includes:

after the target base station determines, according to the synchronization protocol data packet identifier of the data packet, that a progress of receiving a data packet by the target base station from the source base station is faster than or equal to a progress of the service of receiving a data packet by the target base station from a core network by using the multicast/multicast bearer, using, by the target base station, the multicast/multicast bearer to replace the unicast bearer used by the UE, and instructing the source base station to release a context of the UE.

Specifically, as shown in FIG. 4, steps of performing a user equipment handover in this scenario specifically include:

Step 1:

A GCSE establishes a unicast bearer used by an S-eNB of an access network, where the unicast bearer is used to send data packet of a group communication service to the S-eNB, and the S-eNB sends configuration information that is of both the unicast bearer and a channel to UE.

The UE reads the configuration information that is of both the bearer and the channel and that is sent by the S-eNB, and prepares to receive group communication service data packet by using a configured unicast channel.

Step 2:

The GCSE uses the established bearer to send the group communication service data packet to the S-eNB, and the S-eNB uses an air interface unicast radio bearer to send the received group communication service data packet to the UE.

Step 3:

When the S-eNB determines that the UE may be handed over from a current serving cell to a serving cell of a T-eNB, for example, signal quality of a neighboring cell is better than signal quality of the current cell, the S-eNB determines to hand over the UE to the T-eNB.

The S-eNB sends a handover request message to the T-eNB, where the handover request message may include:

a service identifier and/or a TMGI that are/is of a group communication service that requests a handover;

a bearer identifier and/or a logical channel identifier that are/is of the group communication service that requests a handover;

a handover type: Unicast-to-eMBMS, Unicast-to-eMBMS;

a status report indication, which is used to notify the S-eNB that transmission status information needs to be sent to the T-eNB or notify the T-eNB that the handover is a lossless handover;

a data packet forwarding indication, which is used to instruct the S-eNB to forward data packet to the T-eNB; and configuration information of a data packet forwarding channel, for example, a GTP-Tunnel identifier.

For different services, the foregoing steps may be repeated multiple times, that is, the handover request message includes handover request information of multiple group communication services.

Step 4:

If the T-eNB determines that the handover request can be accepted, the T-eNB sends the handover request acknowl-edgement message to the S-eNB, where the handover request acknowledgement message may include:

a service identifier and/or a TMGI that are/is of the group communication service whose handover is accepted;

a bearer identifier and/or a logical channel identifier that are/is of the group communication service whose handover is accepted;

a handover type: Unicast-to-eMBMS, Unicast-to-eMBMS;

eMBMS configuration information that is in the T-eNB and that is of the group communication service whose handover is accepted;

a status report indication, which is used to notify the S-eNB that transmission status information needs to be sent to the T-eNB or notify the S-eNB that the handover is a lossless handover;

a data packet forwarding indication, which is used to instruct the S-eNB to forward data packet to the T-eNB; and configuration information of a data packet forwarding channel, for example, a GTP-Tunnel identifier.

Step 5:

The S-eNB sends a handover command to the UE, so as to instruct the UE to start to hand over to the target base station, where the handover command includes:

a service identifier and/or a TMGI that are/is of the group communication service whose handover is accepted;

a bearer identifier and/or a logical channel identifier that are/is of the group communication service whose handover is accepted;

a handover type: Unicast-to-eMBMS, Unicast-to-eMBMS;

eMBMS configuration information that is in the T-eNB and that is of the group communication service whose handover is accepted; and a status indication, which is used to notify the S-eNB that the handover is a lossless handover.

Specifically, the message may be an RRC Connection RE-configuration (radio link control connection resource reconfiguration) message.

Step 6:

The S-eNB sends a status transmission message to the T-eNB, where the status transmission message includes:

a bearer for forwarding data packet, a logical channel identifier, and/or a TMGI; and a synchronization protocol data packet identifier for forwarding the first data packet that is not sent to the UE, for example, a TS and/or a PN.

Step 7:

The S-eNB sends the forwarded data packet to the T-eNB, carries, in each forwarded data packet, a TS and/or a PN that is corresponding to the data packet, where the S-eNB may send data packet by starting from the first data packet that is not sent to the UE.

Step 8:

The UE is connected to a serving cell of the target base station and sends a handover command response message to the T-eNB. For example, the message may be an RRC Connection RE-configuration Complete (radio link control connection resource reconfiguration complete) message.

Step 9:

The T-eNB sends, to the UE, the data packet received from the S-eNB.

Step 10:

When the T-eNB detects that a synchronization protocol data packet identifier included in a data packet forwarded by the S-eNB is greater than or equal to a synchronization protocol data packet identifier included in group communication service data packet received from the core network, the T-eNB sends a receiving path handover message to the UE, so as to instruct the UE to start to receive the group communication service data packet by using a corresponding broadcast/multicast (eMBMS) channel, where the path handover message may include:

a service identifier and/or a TMGI that are/is of the to-be-handed-over group communication service;

a bearer identifier and/or a logical channel identifier that are/is of the to-be-handed-over group communication service;

a handover type: Unicast-to-eMBMS, Unicast-to-eMBMS;

eMBMS configuration information of the to-be-handed-over group communication service in the T-eNB; and a unicast bearer identifier and/or a logical channel identifier that are/is of the group communication service that needs to be released.

Step 10:

When the UE starts to receive the group communication service data packet from the eMBMS channel configured by the T-eNB, the UE sends a receiving path handover response message to the T-eNB, so as to notify the T-eNB that the UE has completed a handover of a receiving path, where the receiving path handover response message may include:

a service identifier and/or a TMGI that are/is of the to-be-handed-over group communication service; and a bearer identifier and/or a logical channel identifier that are/is of the to-be-handed-over group communication service.

Step 11:

After the T-eNB receives the receiving path handover response message, the T-eNB sends a UE Context Release (UE context release) message to the S-eNB, so as to instruct the S-eNB to release a UE context.

Step 12:

The UE receives the group communication service data packet by using a broadcast/multicast (eMBMS) channel.

A data packet forwarding process is shown in FIG. 5. In step 5A, a GCSE sends data packets to the S-eNB, where the data packets carry a synchronization protocol data packet identifier. In step 5B, the S-eNB delivers the data packets to the UE, and some of the data packets are not sent to the UE. In step 5C, the S-eNB initiates a handover. In step 5D, the S-eNB sends transmission status information to the T-eNB, where the transmission status information includes a synchronization protocol data packet identifier of a data packet that is not successfully sent to the UE. In step 5E, the S-eNB sends a data packet, which is not sent to the UE, to the T-eNB. In step 5F, the T-eNB receives a handover command response message sent by the UE. In step 5G; the T-eNB forwards a data packet sent by the S-eNB to the UE. In step 5H, the T-eNB receives a data packet sent by the GCSE by using an MBMS, and after the T-eNB determines that a subsequent data packet can be sent, in step 5I, the T-eNB sends a path handover message to the UE. In step 5J, the T-eNB sends a UE context release message to the S-eNB. In step 5K, after UE path handover, the T-eNB sends, by using the MBMS, the data packet sent by the GCSE to the UE.

Figure 6:
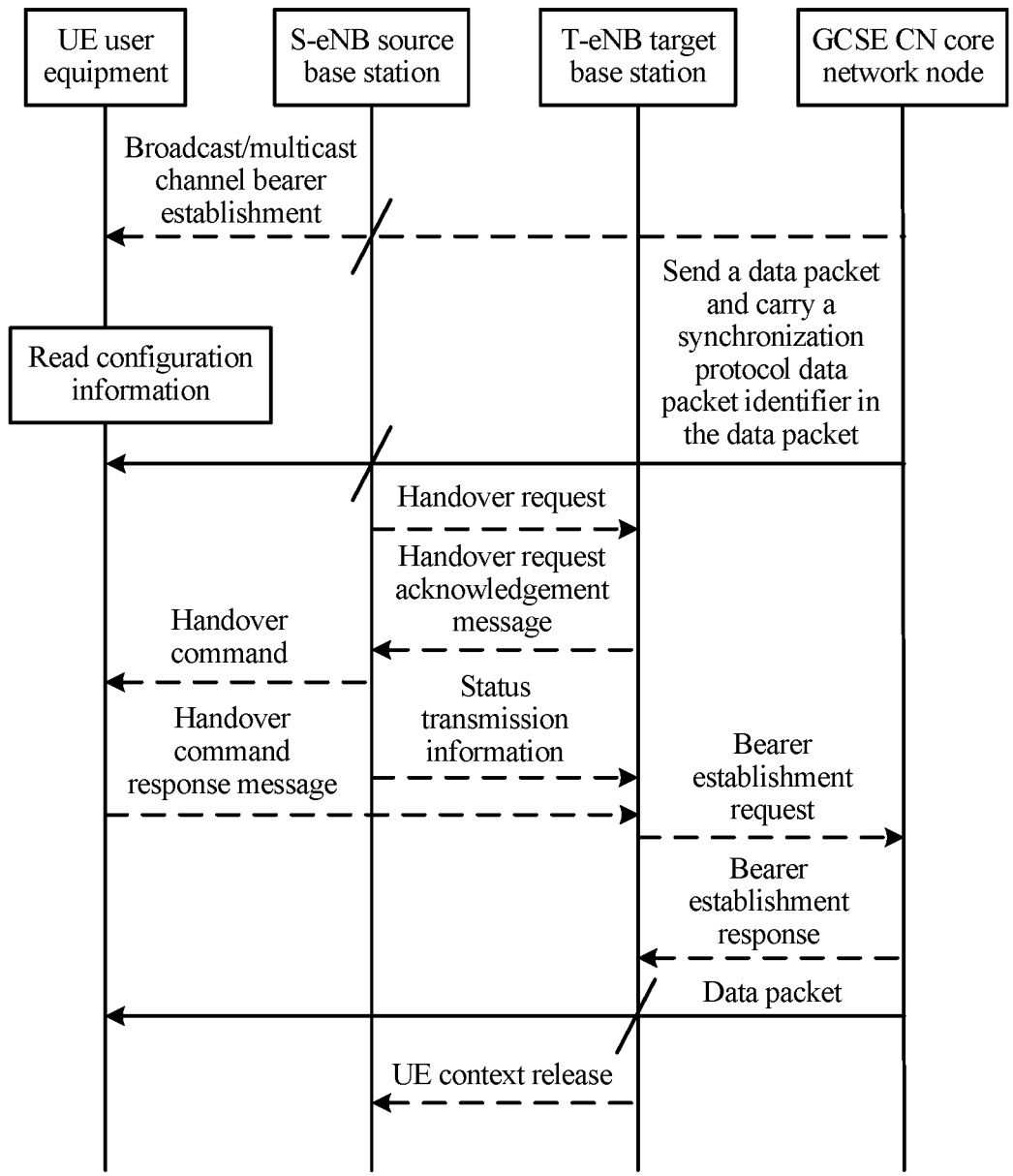
FIG. 6 is a flowchart of a user equipment handover method that is corresponding to still another embodiment according to an embodiment of the present invention.
Figure 7:
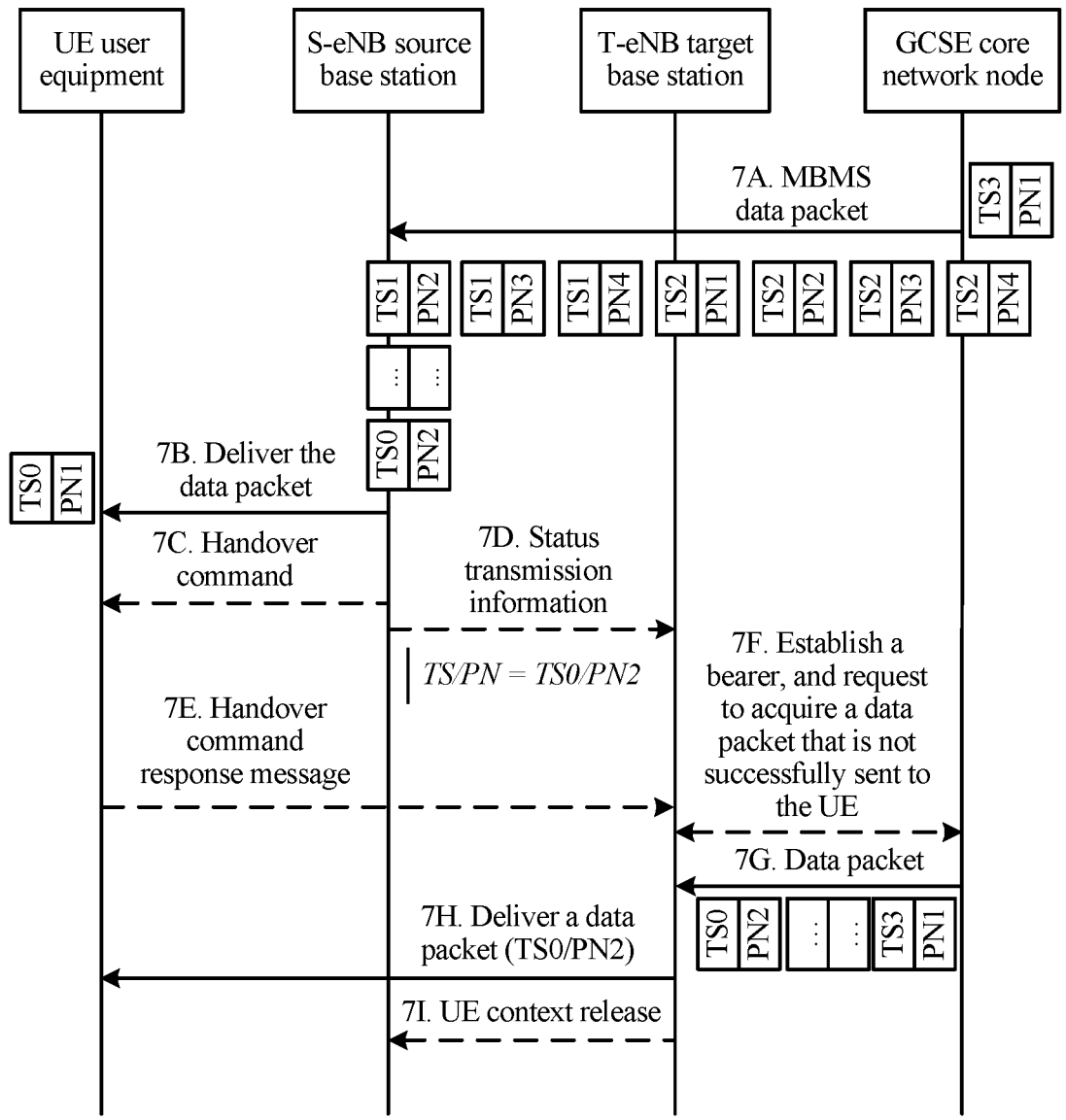
FIG. 7 is a schematic diagram of a data packet forwarding process that is corresponding to still another embodiment according to an embodiment of the present invention.

In embodiments shown in FIG. 6 and FIG. 7, UE uses a multicast/multicast bearer to receive service data packet from a source base station, and needs to use a unicast bearer to receive service data packet from a target base station.

In these embodiments, the target base station establishes the unicast bearer used by the UE, acquires a corresponding data packet according to a synchronization protocol data packet identifier of a data packet that is sent by the source base station but not successfully delivered to the UE, and forwards the data packet to the UE. When a progress of acquiring a data packet by the target base station according to the synchronization protocol data packet identifier of the data packet that is not successfully sent to the UE is faster than or equal to a progress of the service of receiving a data packet by the target base station by using a newly established unicast bearer, the target base station instructs the source base station to release a context of the UE.

The data packet that is not successfully delivered by the source base station to the UE includes a data packet that is not delivered by the source base station to the UE, and a data packet that is not successfully received by the UE, which is confirmed by the source base station in a manner such as UE feedback.

In these embodiments, a GCSE is requested to cache some of delivered data packets, so that they can be re-sent to the target base station.

Specifically, that the target base station determines that user equipment UE needs to be handed over from a source base station to the target base station and needs to perform a handover between a unicast bearer and a multicast/multicast bearer in step S201 specifically includes:

determining, by the target base station according to a service identifier in a handover request sent by the source base station, that a service received by the UE in the source base station by using the multicast/multicast bearer needs to be received by using the unicast bearer.

That the target base station receives a data packet sent by using the multicast/multicast bearer in step S202 includes:

receiving, by the target base station, UE transmission status information sent by the source base station, and receiving the handover command response message sent by the UE, where the UE transmission status information includes the synchronization protocol data packet identifier of the data packet that is not successfully sent to the UE; and establishing, by the target base station, the unicast bearer used by the UE, acquiring, according to the synchronization protocol data packet identifier of the data packet that is not successfully sent to the UE, the data packet that is not successfully sent to the UE, and forwarding the data packet to the UE.

That when the target base station determines, according to a synchronization protocol data packet identifier of the data packet, that a progress of receiving a data packet by the target base station by using an original bearer is faster than or equal to a progress of receiving a data packet by the target base station by using a target bearer, the target base station hands over the UE to the target bearer in step S203 includes:

after it is determined that a progress of acquiring a data packet by the target base station according to the synchronization protocol data packet identifier of the data packet that is not successfully sent to the UE is faster than or equal to a progress of the service of receiving a data packet by the target base station by using a newly established unicast bearer, instructing the source base station to release a context of the UE.

Preferably, the establishing, by the target base station, the unicast bearer used by the UE, acquiring, according to the synchronization protocol data packet identifier of the data packet that is not successfully sent to the UE, the data packet that is not successfully sent to the UE, and forwarding the data packet to the UE specifically includes:

when the target base station requests the core network to establish the unicast bearer, sending, by the target base station, to the core network, the synchronization protocol data packet identifier of the data packet that is not successfully sent to the UE, receiving the data packet sent by the core network according to the synchronization protocol data packet identifier of the data packet that is not successfully sent to the UE, and forwarding the data packet to the UE.

Further, the synchronization protocol data packet identifier that is included in the UE transmission status information and that is of the data packet that is not successfully sent to the UE may be only a synchronization protocol data packet identifier of the first data packet that is not successfully sent to the UE, so that the target base station acquires, according to the synchronization protocol data packet identifier, a data packet by starting from the first data packet that is not successfully sent to the UE, and forwards the data packet to the UE.

Specifically, as shown in FIG. 6, steps of performing a user equipment handover in this scenario specifically include:

Step 1:

A GCSE establishes a broadcast/multicast bearer used by an S-eNB of an access network, where the broadcast/multicast bearer is used to send broadcast/multicast data packet of a group communication service to the S-eNB, and the S-eNB sends configuration information that is of both the broadcast/multicast bearer and an eMBMS channel to UE.

Step 2:

The UE reads the configuration information that is of both the broadcast/multicast bearer and the channel and that is sent by the S-eNB, acquires eMBMS channel configuration of the group communication service in a current serving cell, and prepares to receive group communication service data packet by using a configured eMBMS channel.

Step 3:

The GCSE uses the established bearer to send the group communication service data packet to the S-eNB; the S-eNB uses the eMBMS to send the received group communication service data packet to the UE; and the UE receives, according to the read air interface eMBMS broadcast/multicast channel configuration information sent by the S-eNB, the group communication service data packet by using an eMBMS broadcast/multicast channel of an air interface.

Step 4:

When the S-eNB determines that the UE may be handed over from a current serving cell to a serving cell of the T-eNB, for example, signal quality of a neighboring cell is better than signal quality of the current cell, the S-eNB determines to hand over the UE to the T-eNB.

The S-eNB sends a handover request message to the T-eNB, where the handover request message may include:

a service identifier and/or a TMGI that are/is of a group communication service that requests a handover;

a bearer identifier and/or a logical channel identifier that are/is of the group communication service that requests a handover;

a handover type: multicast-to-unicast; and a status report indication, which is used to notify the S-eNB that transmission status information needs to be sent to the T-eNB or notify the T-eNB that the handover is a lossless handover.

For different services, the foregoing steps may be repeated multiple times, that is, the handover request message includes handover request information of multiple group communication services.

Step 5:

If the T-eNB determines that the handover request can be accepted, the T-eNB sends the handover request acknowledgement message to the S-eNB, where the handover request acknowledgement message may include:

a service identifier and/or a TMGI that are/is of the group communication service whose handover is accepted;

a bearer identifier and/or a logical channel identifier that are/is of the group communication service whose handover is accepted;

a handover type: multicast-to-unicast;

eMBMS configuration information that is in the T-eNB and that is of the group communication service whose handover is accepted; and a status report indication, which is used to notify the S-eNB that transmission status information needs to be sent to the T-eNB or notify the S-eNB that the handover is a lossless handover.

Step 6:

The S-eNB sends a handover command to the UE, so as to instruct the UE to start to hand over to the target base station, where the handover command includes:

a service identifier and/or a TMGI that are/is of the group communication service whose handover is accepted;

a bearer identifier and/or a logical channel identifier that are/is of the group communication service whose handover is accepted;

a handover type: Unicast-to-eMBMS, Unicast-to-eMBMS;

eMBMS configuration information that is in the T-eNB and that is of the group communication service whose handover is accepted; and a status indication, which is used to notify the S-eNB that the handover is a lossless handover.

Specifically, the message may be an RRC RE-configuration Request (radio link control resource reconfiguration request) message.

Step 7:

The S-eNB sends a status transmission message to the T-eNB, where the status transmission message includes:

a bearer for forwarding data packet, a logical channel identifier, and/or a TMGI; and a synchronization protocol data packet identifier corresponding to the first data packet that is not sent to the UE.

Step 8:

The UE is connected to a serving cell of the target base station and sends a handover command response message to the T-eNB. For example, the message may be an RRC RF-configuration Complete (radio link control resource reconfiguration complete) message.

Step 9:

After receiving the message, the T-eNB starts to request to establish a core network bearer of the UE; and the T-eNB sends a bearer establishment request message to a GCSE core network node, where the request message may include one or a combination of the following:

an identifier, a TMGI, and an eMBMS bearer identifier that are of the group communication service; and a synchronization protocol data packet identifier of the first data packet that is not sent to the UE.

Step 9-1:

The GCSE core network node sends a bearer establishment response message to the T-eNB, so as to notify the T-eNB that a bearer is successfully established.

Step 10:

The GCSE core network node sends group communication service data packet of the group communication service to the T-eNB by starting from the first data packet that is corresponding to the synchronization protocol data packet identifier and that is not sent to the UE.

Optionally, a to-be-sent data packet may include a synchronization protocol data packet identifier of the data packet, for example, a TS and/or a PN.

The T-eNB sends the received data packet to the UE.

Step 13:

After the T-eNB starts to send, to the UE, the group communication service data packet that is sent by the core network by using a GTP tunnel bearer, the T-eNB sends a UE Context Release message to the S-eNB, so as to instruct the S-eNB to release a UE context.

A data packet forwarding process is shown in FIG. 7. In step 7A, a GCSE sends data packets to the S-eNB by using an MBMS bearer. In step 7B, the S-eNB delivers the data packets to the UE, and some of the data packets are not sent to the UE. In step 7C, the S-eNB initiates a handover. In step 7D, the S-eNB sends transmission status information to the T-eNB, where the transmission status information includes a synchronization protocol data packet identifier of the first data packet that is not successfully sent to the UE. In step 7E, the T-eNB receives a handover command response message sent by the UE. In step 7F, the T-eNB establishes a core network bearer used by the UE, and acquires, from the core network, a data packet that is not successfully sent to the UE. In step 7G, the T-eNB receives a data packet that is sent by the GCSE by using a unicast and that carries the synchronization protocol data packet identifier. In step 7H, the T-eNB sends, to the UE, the data packet sent by the GCSE. In step 7I, T-eNB sends a UE context release message to the S-eNB.

Figure 8:
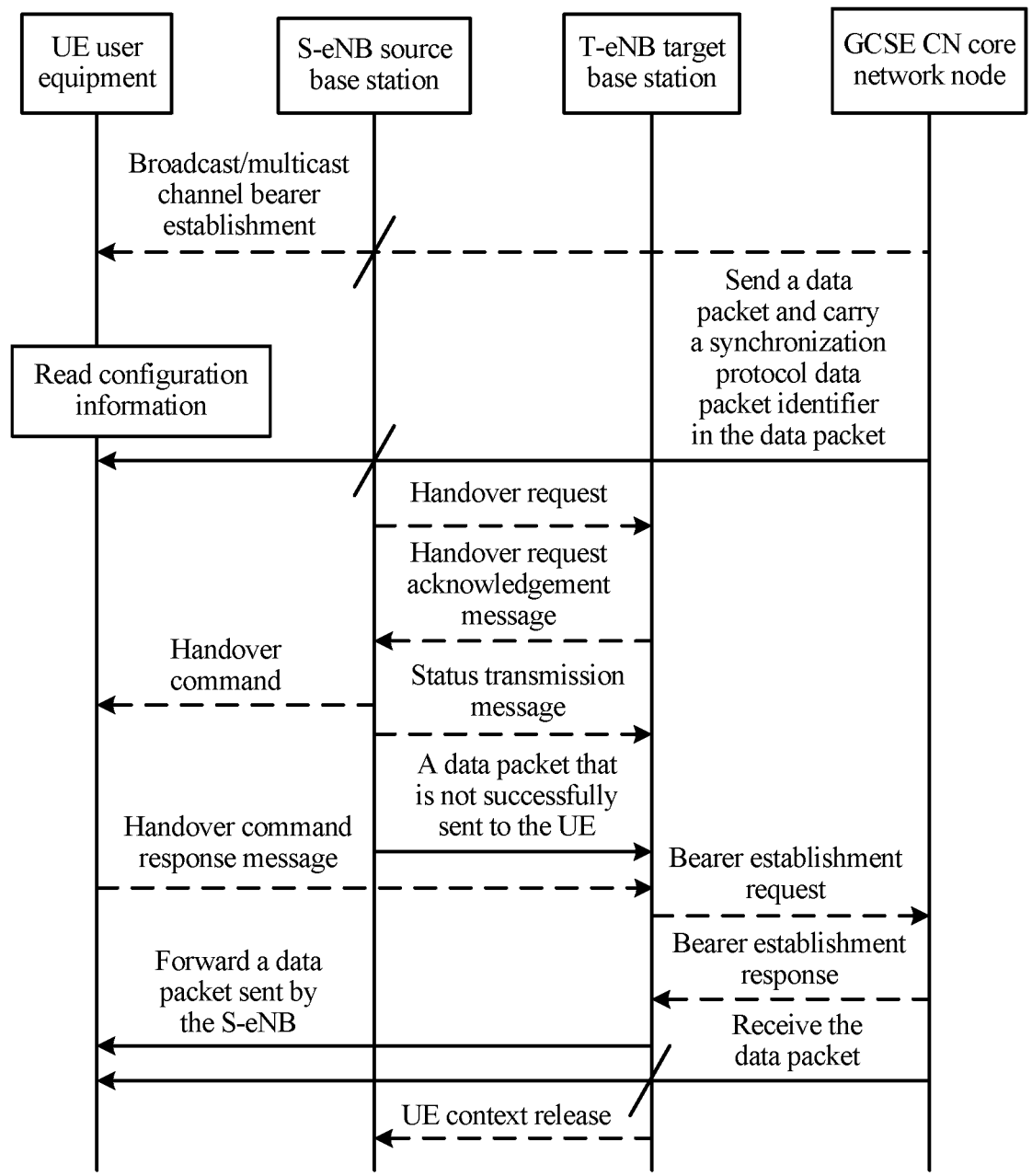
FIG. 8 is a flowchart of a user equipment handover method that is corresponding to yet another embodiment according to an embodiment of the present invention.
Figure 9:
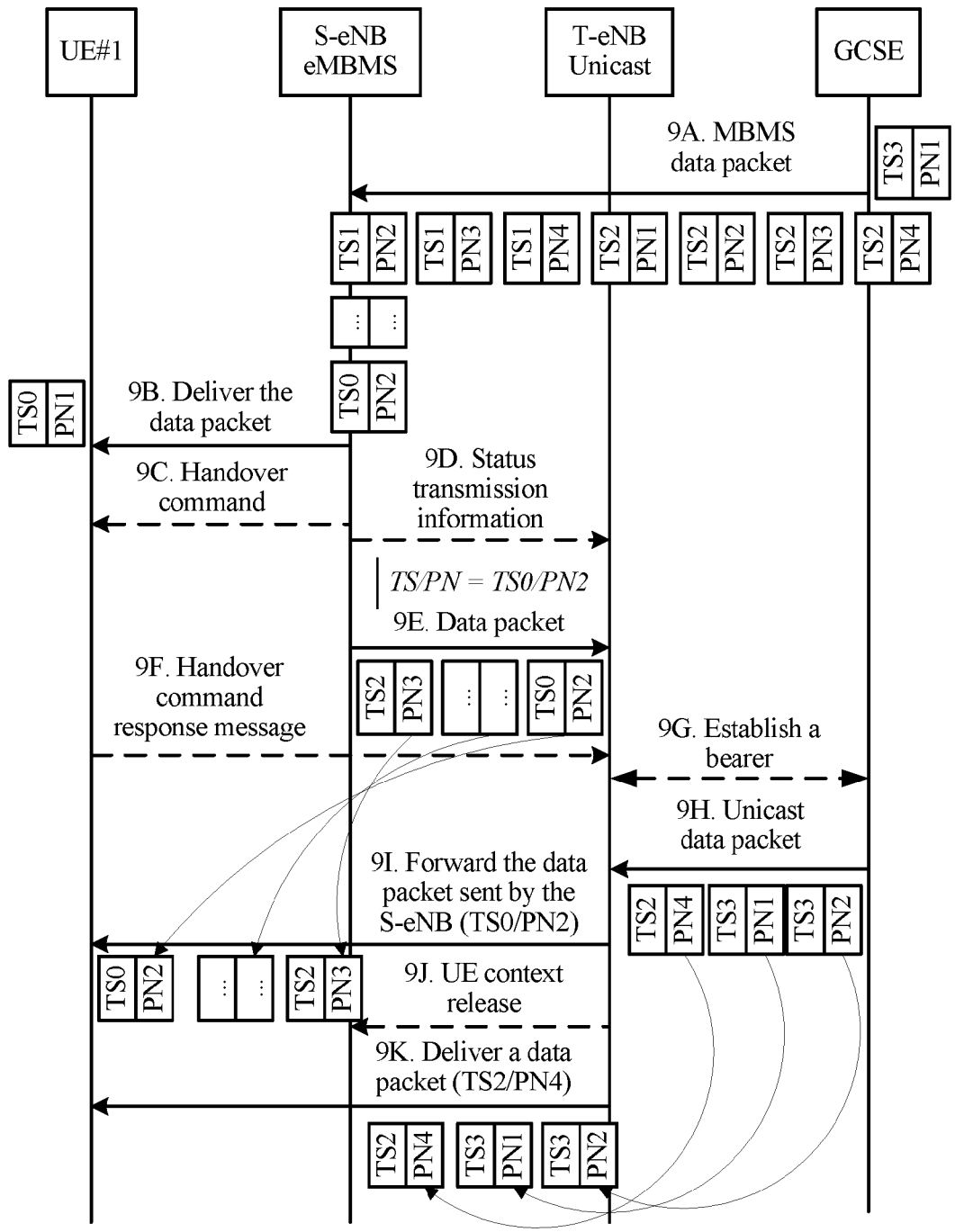
FIG. 9 is a schematic diagram of a data packet forwarding process that is corresponding to yet another embodiment according to an embodiment of the present invention.

In embodiments shown in FIG. 8 and FIG. 9, UE uses a multicast/multicast bearer to receive service data packet from a source base station, and needs to use a unicast bearer to receive service data packet from a target base station.

In these embodiments, the target base station establishes the unicast bearer used by the UE, receives a synchronization protocol data packet identifier of a data packet that is sent by the source base station but not successfully delivered to the UE and the data packet, forwards the data packet to the UE. When a progress of receiving a data packet by the target base station from the source base station is faster than or equal to a progress of the service of receiving a data packet by the target base station by using a newly established unicast bearer, the target base station instructs the source base station to release a context of the UE.

The data packet that is not successfully delivered by the source base station to the UE includes a data packet that is not delivered by the source base station to the UE, and a data packet that is not successfully received by the UE, which is confirmed by the source base station in a manner such as UE feedback.

Specifically, that the target base station determines that user equipment UE needs to be handed over from a source base station to the target base station and needs to perform a handover between a unicast bearer and a multicast/multicast bearer in step S201 specifically includes:

determining, by the target base station according to a service identifier in a handover request sent by the source base station, that a service received by the UE in the source base station by using the multicast/multicast bearer needs to be received by using the unicast bearer.

That the target base station receives a data packet sent by using the unicast bearer and a data packet sent by using the multicast/multicast bearer in step S202 includes:

receiving, by the target base station, UE transmission status information sent by the source base station, and receiving the handover command response message sent by the UE, where the UE transmission status information includes the synchronization protocol data packet identifier of the data packet that is not successfully sent to the UE;

receiving, by the target base station, the data packet that is not successfully sent by the source base station to the UE;

establishing, by the target base station, the unicast bearer used by the UE, and sending a data packet identifier request indication to a core network, so as to instruct the core network to carry the synchronization protocol data packet identifier in the data packet when sending the data packet; and forwarding, by the target base station, the data packet that is not successfully sent to the UE to the UE, and receiving the data packet delivered by the core network by using the unicast bearer.

That when the target base station determines, according to a synchronization protocol data packet identifier of the data packet, that a progress of receiving a data packet by the target base station by using an original bearer is faster than or equal to a progress of receiving a data packet by the target base station by using a target bearer, the target base station hands over the UE to the target bearer in step S203 includes:

when a progress of receiving the data packet by the target base station from the source base station is faster than or equal to a progress of the service of receiving the data packet by the source base station from the core network by using a newly established unicast bearer, instructing the source base station to release a context of the UE.

Further, the synchronization protocol data packet identifier that is included in the UE transmission status information and that is of the data packet that is not successfully sent to the UE may be only a synchronization protocol data packet identifier of the first data packet that is not successfully sent to the UE.

Specifically, as shown in FIG. 8, steps of performing a user equipment handover in this scenario specifically include:

Step 1:

A GCSE establishes a broadcast/multicast bearer used by an S-eNB of an access network, where the broadcast/multicast bearer is used to send broadcast/multicast data packet of a group communication service to the S-eNB, and the S-eNB sends configuration information that is of both the broadcast/multicast bearer and an eMBMS channel to UE.

Step 2:

The UE reads the configuration information that is of both the broadcast/multicast bearer and the eMBMS channel and that is sent by the S-eNB, acquires eMBMS channel configuration of the group communication service in a current serving cell, and prepares to receive group communication service data packet by using a configured eMBMS channel.

Step 3:

The GCSE uses the established bearer to send the group communication service data packet to the S-eNB; the S-eNB uses the eMBMS to send the received group communication service data packet to the UE; and the UE receives, according to the read air interface eMBMS broadcast/multicast channel configuration information sent by the S-eNB, the group communication service data packet by using an eMBMS broadcast/multicast channel of an air interface.

Step 4:

When the S-eNB determines that the UE may be handed over from a current serving cell to a serving cell of a T-eNB, for example, signal quality of a neighboring cell is better than signal quality of the current cell, the S-eNB determines to hand over the UE to the T-eNB.

The S-eNB sends a handover request command to the T-eNB, where the handover request message may include:

a service identifier and/or a TMGI that are/is of a group communication service that requests a handover;

a bearer identifier and/or a logical channel identifier that are/is of the group communication service that requests a handover;

a handover type: multicast-to-unicast;

a status report indication, which is used to notify the S-eNB that transmission status information needs to be sent to the T-eNB or notify the T-eNB that the handover is a lossless handover;

a data packet forwarding indication, which is used to instruct the S-eNB to forward data packet to the T-eNB; and configuration information of a data packet forwarding channel, for example, a GTP-Tunnel identifier.

For different services, the foregoing information may be repeated multiple times, that is, the handover request message includes handover request information of multiple group communication services.

Step 5:

If the T-eNB determines that the handover request can be accepted, the T-eNB sends the handover request acknowledgement message to the S-eNB, where the handover request acknowledgement message may include:

a service identifier and/or a TMGI that are/is of the group communication service whose handover is accepted;

a bearer identifier and/or a logical channel identifier that are/is of the group communication service whose handover is accepted;

a handover type: multicast-to-unicast;

eMBMS configuration information that is in the T-eNB and that is of the group communication service whose handover is accepted;

a status report indication, which is used to notify the S-eNB that transmission status information needs to be sent to the T-eNB or notify the S-eNB that the handover is a lossless handover;

a data packet forwarding indication, which is used to instruct the S-eNB to forward data packet to the T-eNB; and configuration information of a data packet forwarding channel, for example, a GTP-Tunnel identifier.

Step 6:

The S-eNB sends a handover command to the UE, so as to instruct the UE to start to hand over to the target base station, where the handover command includes:

a service identifier and/or a TMGI that are/is of the group communication service whose handover is accepted;

a bearer identifier and/or a logical channel identifier that are/is of the group communication service whose handover is accepted;

a handover type: Unicast-to-eMBMS, Unicast-to-eMBMS;

eMBMS configuration information that is in the T-eNB and that is of the group communication service whose handover is accepted; and a status indication, which is used to notify the S-eNB that the handover is a lossless handover.

Specifically, the message may be an RRC RE-configuration Request (radio link control resource reconfiguration request) message.

Step 7:

The S-eNB sends a status transmission message to the T-eNB, where the status transmission message includes:

a bearer for forwarding data packet, a logical channel identifier, and/or a TMGI; and a synchronization protocol data packet identifier for forwarding the first data packet that is not sent to the UE.

Step 8:

The S-eNB sends the forwarded data packet to the T-eNB, carries, in each forwarded data packet, a synchronization protocol data packet identifier that is corresponding to the data packet, where the S-eNB may send data packet by starting from the first data packet that is not sent to the UE.

Step 9:

The UE is connected to a serving cell of the target base station and sends a handover command response message to the T-eNB. For example, the message may be an RRC RF-configuration Complete (radio link control resource reconfiguration complete) message.

Step 10:

After receiving the message, the T-eNB starts to request to establish a core network bearer of the UE; and the T-eNB sends a bearer establishment request message to a GCSE core network node, where the request message may include one or a combination of the following:

an identifier, a TMGI, and an eMBMS bearer identifier that are of the group communication service.

Step 10-1:

The GCSE core network node sends a bearer establishment response message to the T-eNB, so as to notify the T-eNB that a bearer is successfully established.

Step 11:

The T-eNB sends, to the UE, the data packet received from the S-eNB.

Step 12:

The T-eNB receives, by using a GTP tunnel corresponding to a bearer, group communication service data packet sent by the core network, where the group communication service data packet includes a synchronization protocol data packet identifier that is corresponding to the data packet.

When the T-eNB detects that a synchronization protocol data packet identifier included in a data packet forwarded by the S-eNB is greater than or equal to a synchronization protocol data packet identifier included in group communication service data packet received from the core network, the T-eNB starts to send, to the UE, group communication service data packet sent by the core network by using a GTP tunnel bearer.

Step 13:

After the T-eNB starts to send, to the UE, the group communication service data that is sent by the core network by using a GTP tunnel bearer, the T-eNB sends a UE Context Release message to the S-eNB, so as to instruct the S-eNB to release a UE context.

A data packet forwarding process is shown in FIG. 9. In step 9A, a GCSE sends data packets to the S-eNB by using an MBMS bearer. In step 9B, the S-eNB delivers the data packets to the UE, and some of the data packets are not sent to the UE. In step 9C, the S-eNB initiates a handover. In step 9D, the S-eNB sends transmission status information to the T-eNB, where the transmission status information includes a synchronization protocol data packet identifier of the first data packet that is not successfully sent to the UE. In step 9E, the S-eNB sends, to the T-eNB, a data packet that is not sent to the UE. In step 9F, the T-eNB receives a handover command response message sent by the UE. In step 9G; the T-eNB establishes a core network bearer used by the UE, and request the core network to carry a synchronization protocol data packet identifier with a data packet when sending the data packet. In step 9H, the T-eNB receives a data packet that is sent by the GCSE by using a unicast and that carries the synchronization protocol data packet identifier. In step 9I, the T-eNB forwards, to the UE by means of unicast, the data packet that is forwarded by the S-eNB, and after the T-eNB determines that a subsequent data packet can be sent, in step 9J, T-eNB sends a UE context release message to the S-eNB. In step 9K, the T-eNB sends, to the UE, the data packet sent by the GCSE.

Figure 10:
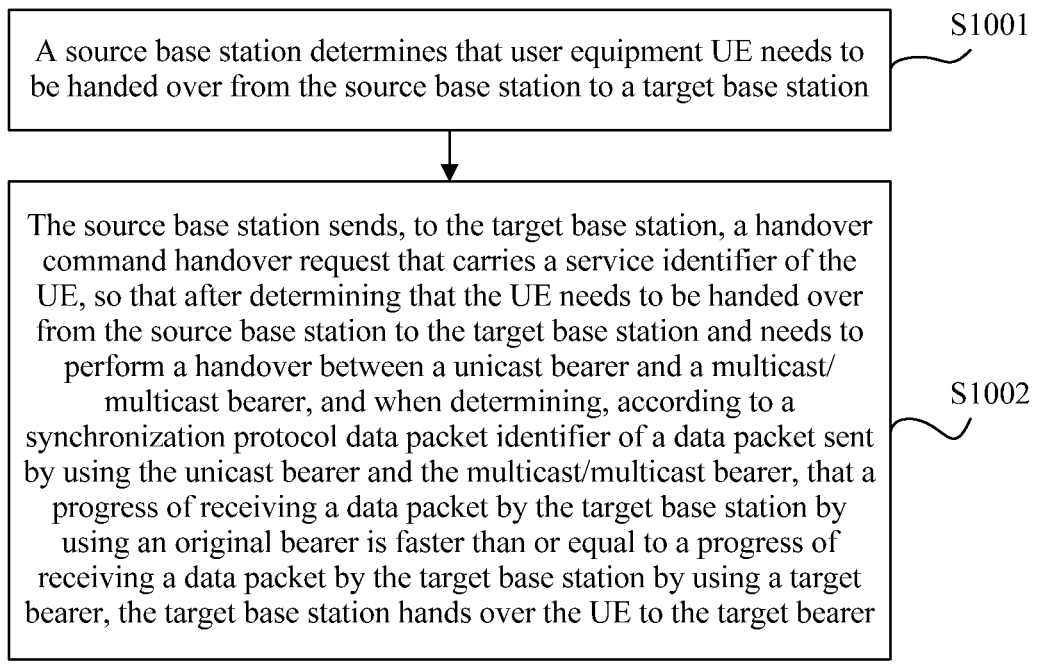
FIG. 10 is a second flowchart of a user equipment handover method according to an embodiment of the present invention.

An embodiment of the present invention further provides a user equipment handover method, as shown in FIG. 10, including:

Step S1001: A source base station determines that user equipment UE needs to be handed over from the source base station to a target base station.

Step S1002: The source base station sends, to the target base station, a handover request that carries a service identifier of the UE, so that after determining that the UE needs to be handed over from the source base station to the target base station and needs to perform a handover between a unicast bearer and a multicast/multicast bearer, and when determining, according to a synchronization protocol data packet identifier of a data packet sent by using the unicast bearer and the multicast/multicast bearer, that a progress of receiving a data packet by the target base station by using an original bearer is faster than or equal to a progress of receiving a data packet by the target base station by using a target bearer, the target base station hands over the UE to the target bearer.

The synchronization protocol data packet identifier is a synchronization sequence identifier and/or a data packet serial number of synchronization data packet.

Figure 11:
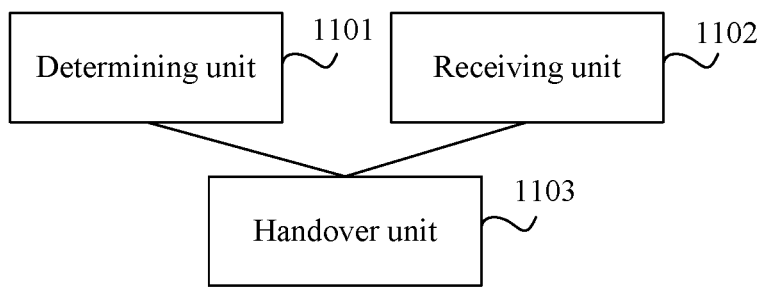
FIG. 11 is a first schematic structural diagram of a base station according to an embodiment of the present invention.

Correspondingly, an embodiment of the present invention provides a base station, where the base station is a target base station that accepts UE in a UE handover process. As shown in FIG. 11, the base station includes:

a determining unit 1101, configured to determine that user equipment UE needs to be handed over from a source base station to the target base station and needs to perform a handover between a unicast bearer and a multicast/multicast bearer;

a receiving unit 1102, configured to receive a data packet sent by using the unicast bearer and a data packet sent by using the multicast/multicast bearer; and a handover unit 1103, configured to: after the determining unit 1101 determines that a handover between the unicast bearer and the multicast/multicast bearer needs to be performed and when the determining unit 1101 determines, according to a synchronization protocol data packet identifier of the data packet received by the receiving unit 1102, that a progress of receiving a data packet by the target base station by using an original bearer is faster than or equal to a progress of receiving a data packet by the target base station by using a target bearer, hand over the UE to a target bearer.

The synchronization protocol data packet identifier is a synchronization sequence identifier and/or a data packet serial number of synchronization data.

Corresponding to the embodiments shown in FIG. 3 to FIG. 5, the determining unit 1101 is specifically configured to:

determine, according to a service identifier in a handover request sent by the source base station, that a service implemented by the UE in the source base station by using the unicast bearer can be incorporated into the multicast/multicast bearer.

Corresponding to the embodiment shown in FIG. 3, the receiving unit 1102 specifically includes:

a message receiving subunit, configured to receive UE transmission status information sent by the source base station, and receive a handover command response message sent by the UE;

a first data packet receiving subunit, configured to receive a data packet that is not successfully sent by the source base station to the UE, and forward the data packet to the UE by means of unicast; and a second data packet receiving subunit, configured to establish the unicast bearer used by the UE, continue to acquire a data packet from a core network, and deliver the data packet to the UE; and the handover unit 1103 is specifically configured to:

when it is determined that a progress of receiving a data packet by the target base station by using the unicast bearer is faster than or equal to a progress of the service of receiving a data packet by the target base station from a core network by using the multicast/multicast bearer, use the multicast/multicast bearer to replace the unicast bearer used by the UE.

Preferably, the second data packet receiving subunit is specifically configured to:

establish the unicast bearer used by the UE, and send a data packet identifier request indication to a core network, so as to instruct the core network to carry the synchronization protocol data packet identifier in the data packet when sending the data packet; and receive the data packet that is sent by the core network and that carries the synchronization protocol data packet identifier, and deliver the data packet to the UE.

Corresponding to the embodiments shown in FIG. 4 to FIG. 5, the receiving unit 1102 specifically includes:

a message receiving subunit, configured to receive UE transmission status information sent by the source base station, and receive the handover command response message sent by the UE, where the UE transmission status information includes an identifier of the data packet that is not successfully sent to the UE; and a data packet receiving subunit, configured to receive a data packet that is not successfully sent by the source base station to the UE, and forward the data packet to the UE by using the unicast bearer; and the handover unit 1103 is specifically configured to:

after it is determined, according to the synchronization protocol data packet identifier of the data packet, that a progress of receiving a data packet by the target base station from the source base station is faster than or equal to a progress of the service of receiving a data packet by the target base station from a core network by using the multicast/multicast bearer, use the multicast/multicast bearer to replace the unicast bearer used by the UE, and instruct the source base station to release a context of the UE.

Corresponding to the embodiments shown in FIG. 6 to FIG. 9, the determining unit 1101 is specifically configured to:

determine, according to a service identifier in a handover request sent by the source base station, that a service received by the UE in the source base station by using a multicast/multicast bearer needs to be received by using the unicast bearer.

Corresponding to the embodiments shown in FIG. 6 to FIG. 7, the receiving unit 1102 specifically includes:

a message receiving subunit, configured to receive UE transmission status information sent by the source base station, and receive the handover command response message sent by the UE, where the UE transmission status information includes a synchronization protocol data packet identifier of the data packet that is not successfully sent to the UE; and a data packet receiving subunit, configured to: establish the unicast bearer of the UE, acquire, according to synchronization protocol data packet identifier of the data packet that is not successfully sent to the UE, the data packet that is not successfully sent to the UE, and forward the data packet to the UE; and the handover unit 1103 is specifically configured to:

after it is determined that a progress of acquiring a data packet by the target base station according to the synchronization protocol data packet identifier of the data packet that is not successfully sent to the UE is faster than or equal to a progress of the service of receiving a data packet by the target base station by using a newly established unicast bearer, instruct the source base station to release a context of the UE.

Alternatively, corresponding to the embodiments shown in FIG. 8 to FIG. 9, the receiving unit 1102 specifically includes:

a message receiving subunit, configured to receive UE transmission status information sent by the source base station, and receive the handover command response message sent by the UE, where the UE transmission status information includes a synchronization protocol data packet identifier of the data packet that is not successfully sent to the UE;

a first data packet receiving subunit, configured to receive a data packet that is not successfully sent by the source base station to the UE; and a second data packet receiving subunit, configured to: establish the unicast bearer used by the UE, and send a data packet identifier request indication to a core network, so as to instruct the core network to carry the synchronization protocol data packet identifier in the data packet when sending the data packet; forward the data packet that is not successfully sent to the UE to the UE; and receive the data packet delivered by the core network by using the unicast bearer; and the handover unit 1103 is specifically configured to:

when a progress of receiving the data packet by the target base station from the source base station is faster than or equal to a progress of the service of receiving the data packet by the source base station from the core network by using a newly established unicast bearer, instruct the source base station to release a context of the UE.

Preferably, corresponding to the embodiments shown in FIG. 6 to FIG. 7, the data packet receiving subunit is specifically configured to:

when the target base station requests the core network to establish the unicast bearer, send, to the core network, the synchronization protocol data packet identifier of the data packet that is not successfully sent to the UE, receive the data packet sent by the core network according to the synchronization protocol data packet identifier of the data packet that is not successfully sent to the UE, and forward the data packet to the UE.

Figure 12:
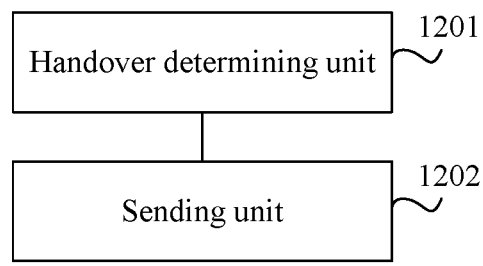
FIG. 12 is a second schematic structural diagram of a base station according to an embodiment of the present invention.

An embodiment of the present invention further provides a base station, where the base station is a source base station in a UE handover process. As shown in FIG. 12, the base station includes:

a handover determining unit 1201, configured to determine that user equipment UE needs to be handed over from the source base station to a target base station; and a sending unit 1202, configured to: after the handover determining unit 1201 determines that the UE needs to be handed over from the source base station to the target base station, send, to the target base station, a handover request that carries a service identifier of the UE, so that after determining that the UE needs to be handed over from the source base station to the target base station and needs to perform a handover between a unicast bearer and a multicast/multicast bearer, and when determining, according to a synchronization protocol data packet identifier of a data packet sent by using the unicast bearer and the multicast/multicast bearer, that a progress of receiving a data packet by the target base station by using an original bearer is faster than or equal to a progress of receiving a data packet by the target base station by using a target bearer, the target base station hands over the UE to the target bearer.

The synchronization protocol data packet identifier is a synchronization sequence identifier and/or a data packet serial number of synchronization data packet.

Figure 13:
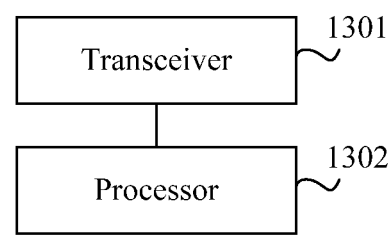
FIG. 13 is a third schematic structural diagram of a base station according to an embodiment of the present invention.

An embodiment of the present invention further provides a base station, where the base station is a target base station that accepts UE in a UE handover process. As shown in FIG. 13, the base station includes:

a transceiver 1301, configured to receive and send a signaling message and a data packet; and a processor 1302, configured to: determine that user equipment UE needs to be handed over from a source base station to the target base station and needs to perform a handover between a unicast bearer and a multicast/multicast bearer; receive a data packet sent by using the unicast bearer and a data packet sent by using the multicast/multicast bearer; and when it is determined, according to a synchronization protocol data packet identifier of the data packet, that a progress of receiving a data packet by the target base station by using an original bearer is faster than or equal to a progress of receiving a data packet by the target base station by using a target bearer is determined, hand over the UE to the target bearer.

This base station may further implement another function that is implemented by the target base station in this embodiment of the present invention.

Figure 14:
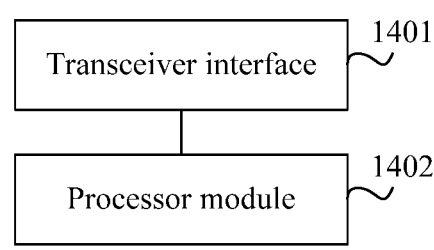
FIG. 14 is a fourth schematic structural diagram of a base station according to an embodiment of the present invention.

An embodiment of the present invention further provides a base station, where the base station is a source base station in a UE handover process. As shown in FIG. 14, the base station includes:

A transceiver interface 1401, configured to receive and send a signaling message and a data packet;

a processor module 1402, configured to: determine that user equipment UE needs to be handed over from the source base station to a target base station, and send, to the target base station, a handover request that carries a service identifier of the UE, so that after determining that the UE needs to be handed over from the source base station to the target base station and needs to perform a handover between a unicast bearer and a multicast/multicast bearer, and when determining, according to a synchronization protocol data packet identifier of a data packet sent by using the unicast bearer and the multicast/multicast bearer, that a progress of receiving a data packet by the target base station by using an original bearer is faster than or equal to a progress of receiving a data packet by the target base station by using a target bearer, the target base station hands over the UE to the target bearer.

This base station may further implement another function that is implemented by the source base station in this embodiment of the present invention.

According to the user equipment handover method and the base station that are provided in the embodiments of the present invention, when a target base station determines that the UE needs to be handed over from a source base station to a target base station and needs to perform a handover between a unicast bearer and a multicast/multicast bearer; because a progress of sending a data packet by using a target bearer may be slower than a progress of sending a data packet by using an original bearer, the target base station receives a data packet sent by using the original bearer and a data packet sent by using the target bearer, and when it is determined that a progress of receiving the data packet by the target base station by using the original bearer is faster than or equal to a progress of receiving the data packet by the target base station by using the target bearer, the target base station hands over the UE to the target bearer, and therefore service continuity in a UE handover process is improved.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A user equipment handover method, comprising:
   determining, by a target base station according to a service identifier in a handover request sent by a source base station, that a service implemented by user equipment (UE) in the source base station by using a unicast bearer can be incorporated into a multicast bearer;
   receiving, by the target base station, UE transmission status information sent by the source base station and a handover command response message sent by the UE;
   receiving, by the target base station, a first data packet that was unsuccessfully sent by the source base station to the UE;
   forwarding, by the target base station, the first data packet to the UE by unicast;
   establishing, by the target base station, the unicast bearer used by the UE;
   acquiring a second data packet from a core network by unicast;
   delivering the second data packet to the UE by unicast;
   receiving, by the target base station, data packets sent by using the multicast bearer;
   determining, by the target base station according to a synchronization protocol data packet identifier of the second data packet, whether a progress of receiving data packets by the target base station by using the unicast bearer is faster than or equal to a progress of receiving the data packets by the target base station by using the multicast bearer;
   handing over, by the target base station, the UE to the multicast bearer when the target base station determines that the progress of receiving the data packets by the target base station by using the unicast bearer is faster than or equal to the progress of the service of receiving the data packets by the target base station from a core network by using the multicast bearer; and
   using, by the target base station, the multicast bearer to replace the unicast bearer to transmit the data packets to the UE.

2. The method according to claim 1,
   wherein the establishing, by the target base station, the unicast bearer used by the UE comprises: sending a data packet identifier request indication to the core network, so as to instruct the core network to carry the synchronization protocol data packet identifier in the data packet when sending the data packet, and
   wherein the data packets sent by the core network using the multicast bearer, carry the synchronization protocol data packet identifier.

3. The method according to claim 1,
   wherein the UE transmission status information comprises an identifier of the data packet that was unsuccessfully sent to the UE
   wherein the handing over, by the target base station, the UE to the target bearer comprises: using, by the target base station, the multicast bearer to replace the unicast bearer used by the UE, and instructing the source base station to release a context of the UE.

4. The method according to claim 1,
wherein the user equipment UE receives the data packets from the source base station by multicast, and
wherein the method further comprises: determining, by the target base station according to the service identifier in the handover request sent by the source base station, that a service received by the UE via the source base station by using the multicast bearer needs to be received by using the unicast bearer.

5. The method according to claim 1, further comprising when the target base station determines, according to the synchronization protocol data packet identifier of the second data packet, that the progress of receiving the data packets by the target base station by using the unicast bearer is not faster than or equal to the progress of receiving the data packets by the target base station by using the multicast bearer, the target base station further needs to continue to receive the data packets sent by using the unicast bearer.

6. A user equipment handover method, comprising:
determining, by a target base station according to a service identifier in a handover request sent by a source base station, that a service received by the UE by using a multicast bearer in the source base station needs to be received from the target base station using a unicast bearer;
receiving, by the target base station from the source base station, UE transmission status information including a synchronization protocol data packet identifier of a first data packet that was unsuccessfully sent to the UE, and a handover command response message sent by the UE;
establishing, by the target base station, the unicast bearer used by the UE;
acquiring, by the target base station according to the synchronization protocol data packet identifier of the first data packet that was unsuccessfully sent to the UE, the first data packet that was unsuccessfully sent by the source base station to the UE;
forwarding, by the target base station, the first data packet to the UE by unicast;
making a determination, by the target base station according to the synchronization protocol data packet identifier of the first data packet, that progress of receiving data packets by the target base station by using the multicast bearer is faster than or equal to progress of receiving the data packets by the target base station by using the unicast bearer;
handing over, by the target base station after the determination that the progress of acquiring the first data packet by the target base station according to the synchronization protocol data packet identifier of the first data packet that was unsuccessfully sent to the UE is faster than or equal to progress of the service of receiving a second data packet by the target base station by using the unicast bearer; and
instructing the source base station to release a context of the UE.

7. The method according to claim 6,
wherein the establishing, by the target base station, the unicast bearer used by the UE, comprises: sending, by the target base station, to the core network, the synchronization protocol data packet identifier of the first data packet that was unsuccessfully sent to the UE, and
wherein the acquiring of the first data packet comprises: receiving the first data packet sent by the core network according to the synchronization protocol data packet identifier of the first data packet that was unsuccessfully sent to the UE by the source base station.

8. A base station communicating with a core network, a source base station and user equipment (UE), comprising:
a receiver configured to:
receive UE transmission status information sent by the source base station, and receive a handover command response message sent by the UE;
receive a first data packet that was unsuccessfully sent by the source base station to the UE,
acquire a second data packet from the core network by unicast, and
receive data packets sent by using a multicast bearer;
a transmitter, configured to:
forward the first data packet to the UE by unicast,
deliver the second data packet to the UE by unicast; and
a processor configured to:
determine, according to a service identifier in a handover request sent by the source base station, that a service implemented by the UE in the source base station by using a unicast bearer can be incorporated into the multicast bearer,
establish the unicast bearer used by the UE,
determine to hand over the UE to the multicast bearer, according to a synchronization protocol data packet identifier of the second data packet, based on whether a progress of receiving data packets by using the unicast bearer is faster than or equal to a progress of receiving the data packets from the core network by using the multicast bearer, and
use the multicast bearer to replace the unicast bearer to transmit the data packets to the UE.

9. The base station according to claim 8,
wherein the transmitter is configured to send a data packet identifier request indication to the core network to instruct the core network to carry the synchronization protocol data packet identifier in the second data packet when sending the second data packet, and
wherein the receiver is configured to receive the second data packet sent by the core network with the synchronization protocol data packet identifier.

10. The base station according to claim 8,
wherein the UE transmission status information includes an identifier of the first data packet that was unsuccessfully sent to the UE by the source base station, and
wherein the processor is configured to, after it is determined to hand over the UE to the multicast bearer, instruct the source base station to release a context of the UE.

11. The base station according to claim 8, wherein the processor is further configured to determine, according to the synchronization protocol data packet identifier of the data packet received by the receiver, to continue to receive the data packets sent by the unicast bearer when the progress of receiving the data packets by using the unicast bearer is not faster than or equal to the progress of receiving the data packets by using the multicast bearer.

* * * * *